US012467414B2

(12) United States Patent
Singh et al.

(10) Patent No.: US 12,467,414 B2
(45) Date of Patent: Nov. 11, 2025

(54) APPARATUS AND METHOD FOR PRESSURIZING AND SUPPLYING GASEOUS FUEL TO AN INTERNAL COMBUSTION ENGINE

(71) Applicant: CESPIRA CANADA LIMITED PARTNERSHIP, Vancouver (CA)

(72) Inventors: Ashish Singh, Surrey (CA); Gage Garner, West Vancouver (CA)

(73) Assignee: CESPIRA CANADA LIMITED PARTNERSHIP, Vancouver (CA)

( * ) Notice: Subject to any disclaimer, the term of this patent is extended or adjusted under 35 U.S.C. 154(b) by 0 days.

(21) Appl. No.: 18/568,089

(22) PCT Filed: Jun. 23, 2022

(86) PCT No.: PCT/CA2022/051015
§ 371 (c)(1),
(2) Date: Dec. 7, 2023

(87) PCT Pub. No.: WO2022/266769
PCT Pub. Date: Dec. 29, 2022

(65) Prior Publication Data
US 2024/0369024 A1    Nov. 7, 2024

Related U.S. Application Data

(60) Provisional application No. 63/214,162, filed on Jun. 23, 2021.

(51) Int. Cl.
*F02D 19/00* (2006.01)
*F02D 19/02* (2006.01)
(Continued)

(52) U.S. Cl.
CPC ....... *F02D 19/022* (2013.01); *F02D 41/0027* (2013.01); *F02M 21/0221* (2013.01); *F02M 21/0239* (2013.01)

(58) Field of Classification Search
CPC ............... F02D 19/022; F02D 41/0027; F02D 41/0221; F02M 21/0239
See application file for complete search history.

(56) References Cited

U.S. PATENT DOCUMENTS 5,713,340 A    2/1998  Vandenberghe et al.
5,832,906 A *  11/1998 Douville .................. F17C 5/06
                                                  123/527
(Continued)

FOREIGN PATENT DOCUMENTS

DE    102017205910 A1    10/2018
WO    2017/097332 A1     6/2017

OTHER PUBLICATIONS

International Search Report, mailed Sep. 29, 2022, for International Application No. PCT/CA2022/051015, 9 pages.

*Primary Examiner* — Phutthiwat Wongwian
*Assistant Examiner* — Sherman D Manley
(74) *Attorney, Agent, or Firm* — Seed Intellectual Property Law Group LLP

(57) ABSTRACT

An apparatus and method for pressurizing and supplying a gaseous fuel to an engine includes a first supply and a second supply of the gaseous fuel stored as a compressed gas. A pressure regulator regulates a pressure of the gaseous fuel fluidly received from the first supply or the second supply, a compressor pressurizes the gaseous fuel fluidly received from the first supply or the second supply, and an accumulator fluidly receives gaseous fuel from the compressor and the pressure regulator. A supply-select valve apparatus is in fluid communication with the first supply and the second supply and is actuatable to fluidly connect the first supply with the compressor or the pressure regulator, and to fluidly connect the second supply with the compressor or the pressure regulator.

20 Claims, 12 Drawing Sheets

(51) Int. Cl.
   *F02D 41/00* (2006.01)
   *F02M 21/02* (2006.01)

(56) References Cited

U.S. PATENT DOCUMENTS

| | | | |
|---|---|---|---|
| 5,868,122 A | 2/1999 | Gram et al. | |
| 7,367,312 B1 | 5/2008 | Boyer et al. | |
| 7,624,770 B2 | 12/2009 | Boyd et al. | |
| 10,598,133 B2* | 3/2020 | Oversby | F02M 21/0224 |
| 10,837,379 B2* | 11/2020 | Magnusson | F02M 21/0245 |
| 11,639,691 B2 | 5/2023 | Puran et al. | |
| 12,085,050 B2* | 9/2024 | Kim | F02D 19/0692 |
| 2002/0185086 A1 | 12/2002 | Newman et al. | |
| 2006/0068970 A1* | 3/2006 | Rose | B60K 6/12 |
| | | | 477/34 |
| 2007/0107678 A1* | 5/2007 | Atkins | F02B 53/02 |
| | | | 123/45 R |
| 2011/0011382 A1* | 1/2011 | Lippa | F02D 19/0655 |
| | | | 123/575 |
| 2012/0186560 A1* | 7/2012 | Lund | F02D 19/0684 |
| | | | 123/495 |
| 2013/0228151 A1* | 9/2013 | Dunn | F02M 21/0221 |
| | | | 123/294 |
| 2014/0116375 A1* | 5/2014 | Kim | F02M 21/0278 |
| | | | 123/456 |
| 2014/0182561 A1* | 7/2014 | Ibizugbe, Jr. | F02B 43/00 |
| | | | 123/511 |
| 2014/0261304 A1* | 9/2014 | McAlister | F02M 21/0224 |
| | | | 123/299 |
| 2014/0299101 A1* | 10/2014 | Melanson | F02M 21/029 |
| | | | 123/445 |
| 2015/0233310 A1* | 8/2015 | Zhang | F02M 21/0224 |
| | | | 701/54 |
| 2016/0017845 A1* | 1/2016 | Huang | F02M 21/0221 |
| | | | 123/495 |
| 2017/0314513 A1* | 11/2017 | Oversby | F02M 25/0854 |
| 2021/0062737 A1* | 3/2021 | Lindberg | F02D 41/40 |
| 2021/0301775 A1* | 9/2021 | Puran | F02M 21/023 |
| 2023/0366514 A1* | 11/2023 | Kemmer | F17C 7/00 |
| 2024/0141857 A1* | 5/2024 | Kim | F02D 19/0615 |
| 2024/0318608 A1* | 9/2024 | Munshi | F02M 47/027 |

* cited by examiner

APPARATUS AND METHOD FOR PRESSURIZING AND SUPPLYING GASEOUS FUEL TO AN INTERNAL COMBUSTION ENGINE

FIELD OF THE INVENTION

The present application relates to an apparatus and method for pressurizing and supplying a gaseous fuel to an internal combustion engine, and in particular a gaseous fuel stored as a compressed gas.

BACKGROUND OF THE INVENTION

Compressed natural gas (CNG) is a gaseous fuel stored under pressure in a vessel, for example a compressed gas cylinder, and is known to be used in trucking applications, and particularly in heavy duty trucks. In those applications that introduce the gaseous fuel later in the compression stroke it is known to use a compressor to maintain the pressure of the gaseous fuel above a threshold by raising the storage pressure of the CNG in the vessel to at least a desired rail pressure or injection pressure in a fuel rail. The compressor is powered from energy produced by an internal combustion engine and operation of the compressor increases parasitic losses and reduces fuel economy of the engine. Power consumption of the compressor is a function of the pressure rise from the vessel to the fuel rail and a flow rate of gaseous fuel through the compressor.

The work required by the compressor is small or even zero when the vessel is full, but as the vessel pressure diminishes the work required by the compressor steadily increases to raise the gas pressure. A capacity of the compressor, which is related to a size of the compressor, must be selected to meet engine fuel demand during transient engine operating conditions that can exhibit large increases in engine fuel demand compared to steady state operating conditions. Eventually the parasitic losses from the compressor become too great for the engine to operate and an unused amount of fuel remains in the vessel.

The state of the art is lacking in techniques for pressurizing and supplying gaseous fuel to an internal combustion engine. The present apparatus and method provide a technique for improving the pressurization and supply of gaseous fuel to an internal combustion engine.

SUMMARY OF THE INVENTION

An improved apparatus for pressurizing and supplying a gaseous fuel to an internal combustion engine includes a first supply of the gaseous fuel and a second supply of the gaseous fuel, the gaseous fuel can be stored as a compressed gas in the first supply and the second supply. There can be a pressure regulator that regulates a pressure of the gaseous fuel fluidly received from the first supply or the second supply, and a compressor that pressurizes the gaseous fuel fluidly received from the first supply or the second supply. An accumulator can be configured to fluidly receive gaseous fuel from the compressor and the pressure regulator. A supply-select valve apparatus can be in fluid communication with the first supply and the second supply and actuatable to fluidly connect the first supply with the compressor or the pressure regulator, and to fluidly connect the second supply with the compressor or the pressure regulator. The internal combustion engine fluidly receives gaseous fuel from the accumulator for combustion therein. More particularly, there can be a second pressure regulator that regulates a pressure of the gaseous fuel received from the accumulator to a desired rail pressure in a fuel rail that supplies the internal combustion engine with the gaseous fuel for combustion.

In an exemplary embodiment, there can be a first-supply pressure sensor that generates signals representative of a pressure of the gaseous fuel in the first supply, and a controller operatively connected with the supply-select valve apparatus, the compressor, and the first-supply pressure sensor. The controller can be programmed to receive signals from the first-supply pressure sensor and determine the pressure of the gaseous fuel in the first supply, and in a first stage, when the pressure of the gaseous fuel in the first supply is greater than or equal to a threshold pressure of the gaseous fuel in the accumulator, command the supply-select valve apparatus to supply the gaseous fuel from the first supply to the pressure regulator, and command the compressor to an off state.

There can be a second-supply pressure sensor operatively connected with the controller, and that generates signals representative of a pressure of the gaseous fuel in the second supply. The controller can be further programmed to receive signals from the second-supply pressure sensor and determine the pressure of the gaseous fuel in the second supply, and in a second stage, when the pressure of the gaseous fuel in the first supply is less than the threshold pressure of the gaseous fuel in the accumulator and greater than or equal to a lower storage threshold pressure of the gaseous fuel in the first supply, and the pressure of the gaseous fuel in the second supply is greater than the threshold pressure of the gaseous fuel in the accumulator, command the supply-select valve apparatus to supply the gaseous fuel from the first supply to the compressor and to supply the gaseous fuel from the second supply to the pressure regulator, and command the compressor to pressurize the gaseous fuel fluidly received from the first supply into the accumulator. There can be an accumulator pressure sensor operatively connected with the controller, and that generates signals representative of a pressure of the gaseous fuel in the accumulator. The controller can be further programmed to receive signals from the accumulator pressure sensor and determine the pressure of the gaseous fuel in the accumulator, such that in the second stage the pressure regulator supplies gaseous fuel from the second supply to the accumulator when the pressure of the gaseous fuel in the accumulator is less than the threshold pressure of the gaseous fuel in the accumulator. The threshold pressure can be a lower-threshold pressure of the gaseous fuel in the accumulator. The controller can be further programmed in the second stage to command the compressor to an off state when a pressure of the gaseous fuel in the accumulator is greater than an upper-threshold pressure of the gaseous fuel in the accumulator. The controller can be further programmed to, in the second stage, when the compressor is an off state and when the pressure of the gaseous fuel in the accumulator is between the lower-threshold pressure and the upper-threshold pressure of the gaseous fuel in the accumulator, command the compressor to pressurize the gaseous fuel fluidly received from the first supply of the gaseous fuel.

The controller can be further programmed to, in a third stage, when the pressure of the gaseous fuel in the first supply is less than the lower storage threshold pressure and the pressure of the gaseous fuel in the second supply is greater than or equal to the threshold pressure of the gaseous fuel in the accumulator, command the supply-select valve apparatus to supply the gaseous fuel from the second supply to the pressure regulator, and command the compressor to an off state. In an exemplary embodiment, in the third stage the controller can be further programmed to command the supply-select valve apparatus to fluidly shut-off the first supply from the pressure regulator and the compressor.

The controller can be further programmed to, in a fourth stage, when the pressure of the gaseous fuel in the second supply is less than the threshold pressure of the gaseous fuel in the accumulator, command the supply-select valve apparatus to supply the gaseous fuel from the second supply to the compressor, and command the compressor to pressurize the gaseous fuel fluidly received from the second supply into the accumulator.

In another exemplary embodiment, the first supply can include a first vessel and a second vessel configured such that the second vessel can be employed as an intermediate storage in a multi-stage compression process, where in a first compression stage the compressor pressurizes the gaseous fuel from the first vessel into the second vessel, and in a second compression stage the compressor pressurizes the gaseous fuel from the second vessel into the accumulator. There can be a shut-off valve operatively connected with the controller, and that controls fluid communication of the gaseous fuel between the first vessel and the supply-select valve apparatus. A first three-way valve and a second three-way valve can both be operatively connected with the controller, where the first three-way valve selectively fluidly connects the compressor to the accumulator in a first position and the compressor to the second three-way valve in a second position, the second three-way valve selectively fluidly connects the second vessel to the supply-select valve apparatus in a first position and the second vessel with the first three-way valve in a second position. Preferably, when a pressure of the gaseous fuel in the first vessel is greater than or equal to the lower storage threshold pressure, the first vessel and the second vessel supply the gaseous fuel to the supply-select apparatus simultaneously.

A ratio between a volume of the first supply over a volume of the second supply can be a function of an upper storage threshold pressure, whereby the ratio is directly correlated to the upper storage threshold pressure. In an exemplary embodiment, the ratio can be between a range of 2.33 (7:3) to 4 (4:1) when the upper storage threshold pressure is between a range of 100 bar and 400 bar, and the ratio can be between a range of 4 (4:1) to 9 (9:1) when the upper storage threshold pressure is between a range of 400 bar and 1000 bar. The gaseous fuel can be selected from the list containing ammonia, hydrogen, methane, propane, natural gas, and mixtures of these fuels.

An improved method for pressurizing and supplying a gaseous fuel to an internal combustion engine includes storing the gaseous fuel as a compressed gas in a first supply and a second supply: selectively regulating a pressure of the gaseous fuel from the first supply or a pressure of the gaseous fuel from the second supply to a threshold pressure in an accumulator: selectively compressing the gaseous fuel from the first supply or the gaseous fuel from the second supply into the accumulator; and supplying the internal combustion engine with gaseous fuel from the accumulator.

In an exemplary embodiment, the method can further include regulating a pressure of the gaseous from the accumulator to a desired rail pressure; and supplying the gaseous fuel at the desired rail pressure to the internal combustion engine.

The method can include, in a first stage, when the pressure of the gaseous fuel in the first supply is greater than or equal to the threshold pressure of the gaseous fuel in the accumulator, regulating the pressure of the gaseous fuel from the first supply to the threshold pressure in the accumulator; and fluidly disconnecting the second supply from the accumulator.

The method can include, in a second stage, when the pressure of the gaseous fuel in the first supply is less than the threshold pressure of the gaseous fuel in the accumulator and greater than or equal to a lower storage threshold pressure of the gaseous fuel in the first supply, and the pressure of the gaseous fuel in the second supply is greater than the threshold pressure of the gaseous fuel in the accumulator, compressing the gaseous fuel from the first supply into the accumulator; and regulating the pressure of the gaseous fuel from the second supply to the threshold pressure in the accumulator: such that the pressure of the gaseous fuel in the accumulator is between the threshold pressure and an upper threshold pressure. In the second stage, when the internal combustion engine consumes more fuel than can be supplied by compressing the gaseous fuel from the first supply and the pressure of the gaseous fuel in the accumulator drops below the threshold pressure, a pressure of the gaseous fuel from the second supply can be regulated to the threshold pressure in the accumulator. Additionally, during the second stage, when the pressure of the gaseous fuel in the accumulator is greater than the upper threshold pressure of the gaseous fuel in the accumulator, the gaseous fuel from the first supply can be fluidly disconnected from the accumulator, such that the gaseous fuel from the first supply is not pressurized into the accumulator. Further, in the second stage, when the first supply is fluidly disconnected from the accumulator and the pressure of the gaseous fuel in the accumulator is between the threshold pressure and the upper threshold pressure of the gaseous fuel in the accumulator, the gaseous fuel from the first supply can be compressed into the accumulator.

The method can include, in a third stage, when the pressure of the gaseous fuel in the first supply is less than the lower storage threshold pressure and the pressure of the gaseous fuel in the second supply is greater than or equal to the threshold pressure of the gaseous fuel in the accumulator, regulating the pressure of the gaseous fuel from the second supply to the threshold pressure in the accumulator; and fluidly disconnecting the first supply from the accumulator.

The method can include, in a fourth stage, when the pressure of the gaseous fuel in the second supply is less than the threshold pressure of the gaseous fuel in the accumulator, compressing the gaseous fuel from the second supply into the accumulator.

In an exemplary embodiment the method can include, in the third stage, compressing the gaseous fuel from the first supply into an intermediate storage vessel in a first compression stage; and in a modified second stage, compressing the gaseous fuel from the intermediate storage vessel into the accumulator in a second compression stage; and regulating the pressure of the gaseous fuel from the second supply to the threshold pressure in the accumulator.

An improved apparatus for pressurizing and supplying a gaseous fuel to an internal combustion engine includes a first supply of the gaseous fuel and a second supply of the gaseous fuel. The gaseous fuel can be stored as a compressed gas in the first supply and the second supply. There can be a supply-select valve apparatus in fluid communication with the first supply and the second supply that can be actuatable to select the first supply or the second supply for supplying the gaseous fuel to the internal combustion engine. A compressor has an inlet fluidly receiving the gaseous fuel from the supply-select valve apparatus and for pressurizing the gaseous fuel from the inlet of the compressor to an outlet of the compressor. The apparatus can also include a compressor-select valve apparatus that can be in fluid communication with the supply-select valve apparatus and the outlet of the compressor for selecting the compressor to pressurize the gaseous fuel fluidly received from the supply-select valve apparatus or for bypassing the compressor by fluidly communicating the gaseous fuel received from the supply-select valve apparatus around the compressor. An accumulator can receive the gaseous fuel from the compressor-select valve apparatus and can be in fluid communication with the internal combustion engine. There can be an accumulator pressure sensor arranged for generating signals representative of an accumulator pressure, where the accumulator pressure is a pressure of the gaseous fuel in the accumulator. A controller can be operatively connected with the supply-select valve apparatus, the compressor, the compressor-select valve apparatus, and the accumulator pressure sensor and can be programmed to: (i) receive signals from the accumulator pressure sensor and determine the pressure of the gaseous fuel in the accumulator: (ii) command the supply-select valve apparatus to supply the gaseous fuel from the first supply to the accumulator; and (iii) regulate a pressure of the gaseous fuel in the accumulator equal to or greater than an accumulator-lower-threshold pressure. The programming of the controller to regulate the pressure of the gaseous fuel in the accumulator includes: (i) when the accumulator pressure is less than the accumulator-lower-threshold pressure: command the compressor-select valve apparatus and the compressor to compress the gaseous fuel from the first supply before delivering the gaseous fuel to the accumulator: (ii) when the accumulator pressure is greater than an accumulator-upper-threshold pressure after a first time-delay from when the compressing started: command the compressor-select valve apparatus and the compressor to stop the compressing when supplying the gaseous fuel from the first supply to the accumulator; and (iii) when the accumulator pressure is less than the accumulator-upper-threshold pressure after the first time-delay from when the compressing started: command the supply-select valve apparatus to switch from supplying the gaseous fuel from the first supply to supplying the gaseous fuel from the second supply while still compressing the gaseous fuel before delivering the gaseous fuel to the accumulator.

An improved method for pressurizing and supplying a gaseous fuel to an internal combustion engine includes storing the gaseous fuel as a compressed gas in a first supply and a second supply: supplying the gaseous fuel from the first supply to an accumulator, a pressure of the gaseous fuel in the accumulator has an accumulator pressure, the internal combustion engine consumes the gaseous fuel in the accumulator; regulating a pressure of the gaseous fuel in the accumulator equal to or greater than an accumulator-lower-threshold pressure. The step of regulating includes: (i) when the accumulator pressure is less than the accumulator-lower-threshold pressure: compressing the gaseous fuel from the first supply before delivering the gaseous fuel to the accumulator: (ii) when the accumulator pressure is greater than an accumulator-upper-threshold pressure after a first time-delay from when the compressing started: stopping the compressing when supplying the gaseous fuel from the first supply to the accumulator; and (iii) when the accumulator pressure is less than the accumulator-upper-threshold pressure after the first time-delay from when the compressing started: switching from supplying the gaseous fuel from the first supply to supplying the gaseous fuel from the second supply while still compressing the gaseous fuel before delivering the gaseous fuel to the accumulator.

The invention is not limited to the summary above and includes further features disclosed in the embodiments in the written description of exemplary embodiments herein.

DETAILED DESCRIPTION OF EXEMPLARY EMBODIMENT(S)

Figure 1:
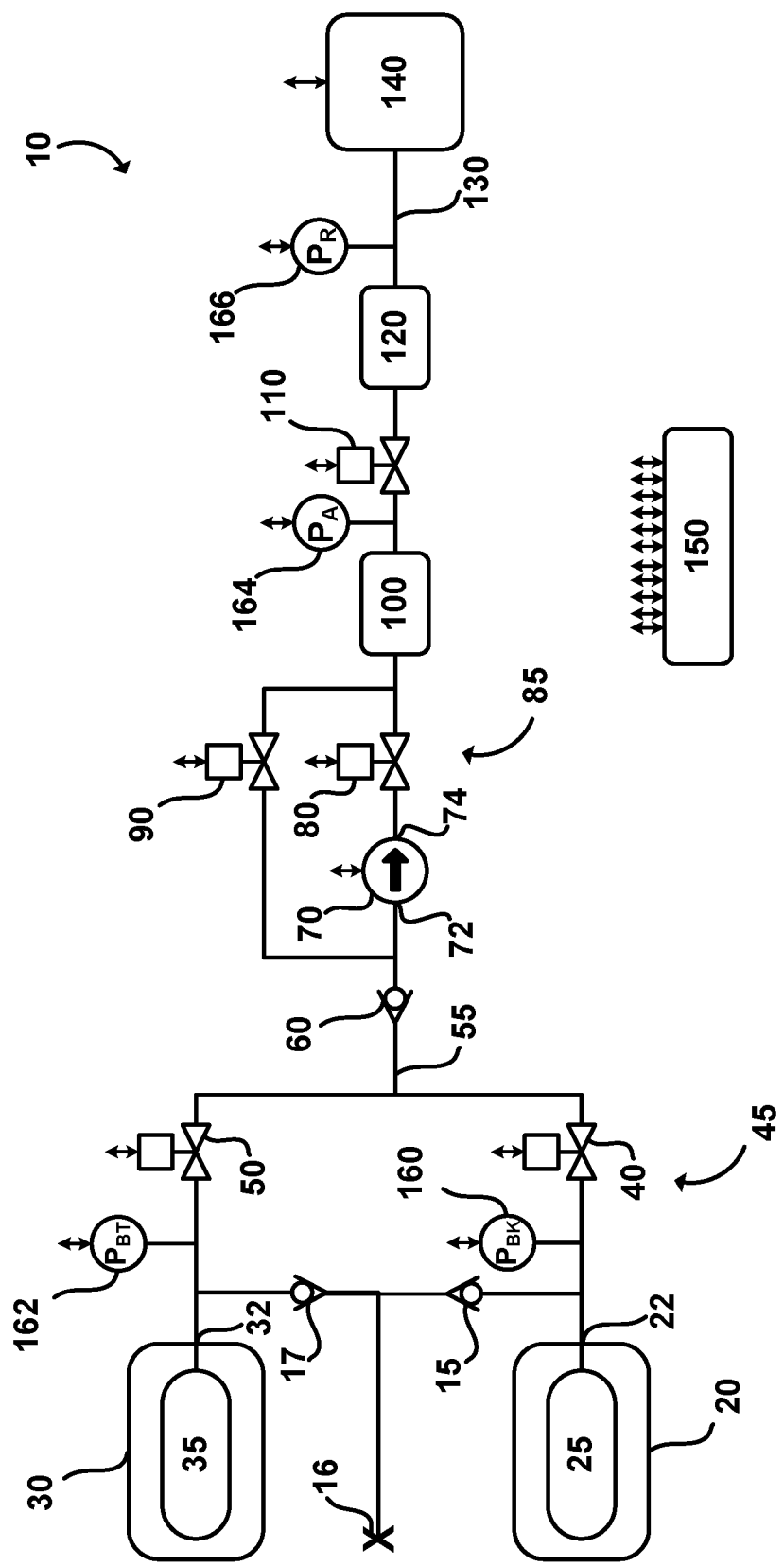
FIG. 1 is a schematic view of a gaseous-fuel system for pressurizing and supplying gaseous fuel to an internal combustion engine according to an embodiment.

Referring to FIG. 1, there is shown gaseous-fuel system 10 for pressurizing and supplying gaseous fuel to internal combustion engine 140 according to an embodiment. System 10 includes first supply 20 and second supply 30, both of which are fuel sources that in the illustrated embodiment include vessel 25 and vessel 35, respectively. First supply 20 is a bulk-fuel supply including bulk vessel 25 and second supply 30 is a booster-fuel supply including booster vessel 35, and the first supply and the second supply will be referred to by the bulk-fuel supply and booster-fuel supply, respectively herein. Both bulk-fuel supply 20 and booster-fuel supply 30 store a compressed gaseous fuel (also referred to as "a compressed gas" herein). Preferably, the type of gaseous fuel stored in both vessels 25 and 35 is the same although this is not a requirement. As used herein, a gaseous fuel is any fuel that is in a gas phase or state at standard temperature and standard pressure, which in the context of this application is defined as a temperature of 0 degrees Celsius (0° C.) and an absolute pressure of 100,000 Pascals (100 kPa) respectively. Exemplary gaseous fuels include (but are not limited to) ammonia, hydrogen, methane, propane, natural gas, and mixtures of these fuels.

Vessels 25 and 35 can hold the compressed gas up to a storage pressure of 700 bar, for example, although higher and lower storage pressures are contemplated, and the vessels are not restricted to any specific pressure range. A maximum rated pressure of vessels 25 and 35 (a maximum pressure the vessels can safely contain) should comply with regulations of the jurisdictions in which they are used. Bulk vessel 25 and booster vessel 35 are both filled with the compressed gas to an upper storage threshold pressure $P_{UST}$ (that can be determined based on the regulation in the operating region and/or a pressure a refueling station is capable of providing) and supply the compressed gas to internal combustion engine 140 where it is combusted until a lower storage threshold pressure $P_{LST}$ is reached below which the engine cannot not operate or operates below a predetermined minimum fuel economy for all engine speed and engine load conditions. Bulk-fuel supply 20 and booster-fuel supply 30 can be connected in such a way that they can be simultaneously (re) filled at a refueling station, yet remain isolated from each other, through refueling receptacle 16 and refueling check valves 15 and 17, respectively. Refueling receptacle 16 can be configured to receive a refueling nozzle (not shown) that is fluidly connected to a refueling vessel (not shown) through to a refueling pump (not shown) for refilling bulk-fuel supply 20 and booster-fuel supply 30, and where the refueling nozzle, the refueling vessel and the refueling pump are part of a refueling station. Inlet/outlet 22 of bulk-fuel supply 20 allows gaseous fuel to flow into or out of bulk-fuel supply 20 depending upon a pressure differential across inlet/outlet 22. Inlet/outlet 32 of booster-fuel supply 30 allows gaseous fuel to flow into or out of booster-fuel supply 30 depending upon a pressure differential across inlet/outlet 32.

Gaseous fuel can be supplied to delivery pipe 55 from bulk-fuel supply 20 through bulk-shutoff valve 40 and from booster-fuel supply 30 through booster-shutoff valve 50. Collectively, shutoff valves 40 and 50 are known as supply-select valve apparatus 45. Shutoff valve 40 can be actuatable by controller 150 to move between an open position and a closed position. Similarly, shutoff valve 50 can be actuatable by controller 150 (separately and independently to shutoff valve 40) to move between an open position and a closed position. In an exemplary embodiment, shutoff valves 40 and 50 (or any other valve herein that is actuatable by controller 150) are solenoid valves that are electromagnetically actuated to move a valve member (not shown) that either opens or closes the valve, and in other embodiments other types of shutoff valves can be employed such as hydraulically actuated valves. Alternatively, in other embodiments shutoff valves 40 and 50 can be part of a three-way valve commanded by controller 150 that selectively switches between bulk-fuel supply 20 and booster-fuel supply 30. The gaseous fuel in delivery pipe 55 can be fluidly communicated through check valve 60 that prevents any fluid downstream from the check valve from returning towards bulk-fuel supply 20 and/or booster-fuel supply 30.

Compressor 70 is downstream from bulk-fuel supply 20 and booster-fuel supply 30 such that the gaseous fuel from supplies 20 and 30 can be pressurized by compressor 70 after which the pressurized gaseous fuel can be fluidly communicated to accumulator 100 (where it is stored at least temporarily) through compressor valve 80. Alternatively, the gaseous fuel can be directly fluidly communicated from check valve 60 to accumulator 100 through compressor-bypass valve 90. In alternative embodiments, valves 80 and 90 can be part of a three-way valve commanded by controller 150 for selecting or bypassing compressor 70. Collectively, valves 80 and 90 are known as compressor-select valve apparatus 85 for selecting compressor 70 to pressurize the gaseous fuel from supply-select valve apparatus 45 or for bypassing compressor 70 by fluidly communicating the gaseous fuel from supply-select valve apparatus 45 around compressor 70. In other embodiments compressor valve 80 can be located adjacent compressor inlet 72 instead of adjacent compressor outlet 74.

Compressor 70 and valves 80 and 90 are actuatable by controller 150, independently and separately, to turn on or off the compressor and open or close the valves. In exemplary embodiments, compressor 70 can be hydraulically driven with power coming from a hydraulic power offtake (not shown) or electrically driven with power coming from an electric alternator (not shown) that are typically part of engine 140. Alternatively, compressor 70 can be mechanically driven directly from a camshaft (not shown) or an engine power takeoff (not shown) of engine 140. When compressor 70 is hydraulically driven, controller 150 can turn the compressor on or off by controlling one or more valves (not shown explicitly but considered part of the compressor) that control a flow of pressurized hydraulic fluid to the compressor. When compressor 70 is electrically driven, controller 150 can turn the compressor on or off by controlling one or more electronic switches (not shown explicitly but considered part of the compressor) that control the flow of electrical energy to the compressor, or alternatively controller 150 can send commands to the compressor to turn on or off. When compressor 70 is mechanically driven by a camshaft or an engine power takeoff, controller 150 can turn the compressor on or off by controlling a clutch (not shown explicitly but considered part of the compressor). In other embodiments, compressor 70 can be followed by a cooler (not shown) to lower the enthalpy (that is, temperature) of the pressurized gas. Power consumption from compressor 70 is a function of pressure rise from compressor inlet to compressor outlet and flow rate.

Accumulator 100 provides a volume of gaseous fuel above a predetermined accumulator pressure or within a predetermined accumulator pressure range that is supplied through fuel-supply shutoff valve 110, actuatable by controller 150, to pressure regulator 120 that regulates gaseous fuel pressure to rail pressure $P_R$ in fuel rail 130 that delivers the gaseous fuel to fuel injectors (not shown) in engine 140. Accumulator 100 can be a separate vessel or can be delivery piping connecting components upstream of the accumulator to components downstream of the accumulator, for example piping connecting valves 80, 90 with shutoff valve 110, and supplying gaseous fuel to engine 140. Each fuel injector can be configured to directly inject the gaseous fuel into respective combustion chambers (not shown) of engine 140 where the fuel is ignited by an ignition source that can employ any conventional technique, for example by a positive-ignition source (such as a pilot fuel, a spark plug, or a hot-surface) or by compression ignition (where the pressure and temperature environment within the combustion chamber constitute the ignition source).

Rail pressure $P_R$ in fuel rail 130 is also referred to as injection pressure and is the pressure at which the gaseous fuel is injected by the fuel injectors into the combustion chambers. Pressure regulator 120 can be a mechanical regulator that does not require control by controller 150, or alternatively pressure regulator 120 can be an electronic regulator that is controlled by the controller. In other embodiments, pressure regulator 120 is not required and the gaseous fuel in accumulator 100 can be supplied through shutoff valve 110 directly to fuel rail 130, particularly in those applications where the tolerance of gaseous fuel pressure in the fuel rail can be relaxed. In dual fuel applications, such as those applications that employ the pilot fuel to ignite the gaseous fuel, pressure regulator 120 can be the type that regulates the pressure of the gaseous fuel based on a pressure of the pilot fuel, such as a dome loaded regulator. Alternatively, the pressure of the gaseous fuel can be regulated according to one of the techniques above and the pressure of the pilot fuel can be regulated based on the gaseous fuel pressure by employing a back-pressure regulator.

A variety of pressure sensors provide signals representative of pressure at various locations in gaseous-fuel system 10 to controller 150. Bulk-fuel-supply pressure sensor 160 sends a signal representative of gaseous fuel pressure in bulk-fuel supply 20 to controller 150. Similarly, booster-fuel-supply pressure sensor 162 sends a signal representative of gaseous fuel pressure in booster-fuel supply 30 to controller 150. Gaseous fuel pressure in bulk-fuel supply 20 is referred to herein as bulk pressure $P_{BLK}$, and gaseous fuel pressure in booster-fuel supply 30 is referred to herein as booster pressure $P_{BSTR}$. Although pressure sensors 160 and 162 are illustrated connected to respective conduits connecting bulk-fuel supply 20 and booster-fuel supply 30 with respective shutoff valves 40 and 50, in alternative embodiments pressure sensors 160 and 162 can be located within bulk-fuel supply 20 and booster-fuel supply 30 respectively, for example in the necks of vessels 25 and 35, or in shutoff valves 40 and 50, respectively. Alternatively, in other embodiments a common pressure sensor (not shown) that measures the pressure in delivery pipe or conduit 55 can add to or replace both pressure sensors 160 and 162. Accumulator pressure sensor 164 sends a signal representative of gaseous fuel pressure in accumulator 100 to controller 150, and fuel-rail pressure sensor 166 sends a signal representative of gaseous fuel pressure in fuel rail 130 to controller 150. Gaseous fuel pressure in accumulator 100 is referred to herein as accumulator pressure $P_A$ and gaseous fuel pressure in fuel rail 130 is referred to herein as rail pressure $P_R$ that is also known as injection pressure.

Controller 150 can be an engine controller of internal combustion engine 140 or a fuel system controller that communicates with the engine controller. Controller 150 can include both hardware and software components. The hardware components can include digital and/or analog electronic components. In the embodiments herein controller 150 includes a processor and one or more memories, including one or more permanent memories, such as FLASH, EEPROM and a hard disk, and a temporary memory, such as SRAM and DRAM, for storing and executing a program. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. The algorithms, modules and steps that are performed by controller 150 are part of the controller. Double-arrowed lines adjacent controller 150 represent communication channels, which can be either bidirectional or unidirectional, to the components that controller 150 either or both receives status information from and sends command information to, and these components also have adjacent double-arrowed lines.

In an exemplary embodiment, rail pressure $P_R$ can vary between a lower-desired-rail pressure $P_{LDR}$, such as 150 bar, when engine 140 is operating at idle, and an upper-desired-rail pressure $P_{UDR}$, such as 300 bar, when engine 140 is operating at rated torque or power (sometimes referred to as maximum specified torque or power for the engine). Notably, even smaller lower-desired-rail pressures $P_{LDR}$ and larger upper-desired-rail pressures $P_{UDR}$ are contemplated. The fuel injectors can inject the gaseous fuel during the intake stroke or the compression stroke into respective combustion chambers in engine 140. Preferably, the fuel injectors inject the gaseous fuel later during the compression stroke such that when the ignition source ignites the gaseous fuel it burns in a diffusion combustion mode. The timing of fuel injection can vary for a variety of reasons, such as over the engine load and engine speed map of engine 140 and bulk pressure $P_{BLK}$ and booster pressure $P_{BSTR}$.

Figure 2:
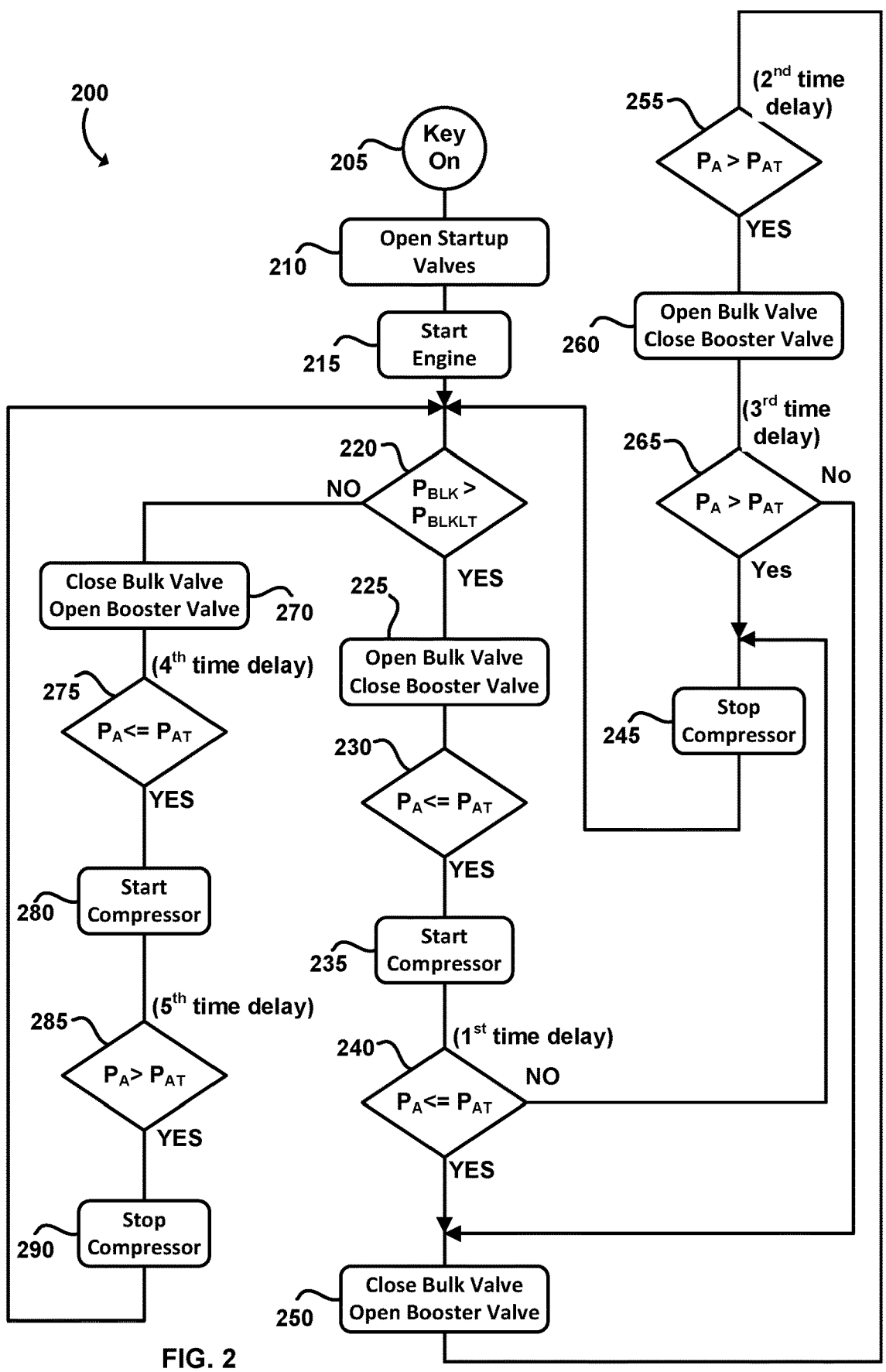
FIG. 2 is a flow chart view of a technique of operating the gaseous-fuel system of FIG. 1 according to an embodiment.

Referring now to FIG. 2 there is shown algorithm 200 that can be programmed in controller 150 that is a technique of pressurizing and supplying the gaseous fuel for internal combustion engine 140. Algorithm 200 starts in step 205 when a process for starting internal combustion engine 140 begins: for example, when an operator turns a key or presses a start button in vehicular applications, and in standalone applications another control algorithm can initiate step 205 alternatively to the operator starting the engine. With reference to both FIGS. 1 and 2, bulk-shutoff valve 40, bypass valve 90 and shutoff valve 110 are opened in step 210 to allow gaseous fuel to flow from bulk-fuel supply 20 towards internal combustion engine 140, and in step 215 engine 140 is started, which can include conventional steps in starting an internal combustion engine.

After engine 140 is started a main portion of algorithm 200 begins, where in step 220 a check can be made to determine whether bulk pressure $P_{BLK}$ (also known as first-supply pressure) is less than or equal to a bulk-lower-threshold pressure $P_{BLKLT}$ (also known as first-supply-lower-threshold pressure), which can be a function of engine speed and engine load and represents a pressure at which bulk-fuel supply 20 cannot supply enough fuel at a sufficient pressure for internal combustion engine 140 to operate at least for a range of engine speed and engine load conditions and is equivalent to lower storage threshold pressure $P_{LST}$. Notably, engine 140 does not require gaseous fuel from bulk-fuel supply 20 to start when accumulator pressure $P_A$ in accumulator 100 is above an accumulator threshold pressure $P_{AT}$. For example, in the event bulk pressure $P_{BLK}$ is less than accumulator pressure $P_A$ at startup, a differential pressure across check valve 60 will block fuel flow from bulk-fuel supply 20 to accumulator 100 and engine 140 will start by consuming fuel in accumulator 100 only.

Returning to step 220, in the event the bulk pressure $P_{BLK}$ is not less than or equal to the bulk-lower-threshold pressure $P_{BLKLT}$ then the algorithm proceeds to step 225, and in the event the bulk pressure $P_{BLK}$ is less than or equal to the bulk-lower-threshold pressure $P_{BLKLT}$ then the algorithm proceeds to step 270. It is noteworthy that during engine startup in step 215 there is typically enough gaseous fuel in accumulator 100 to start engine 140, such that in the event bulk pressure $P_{BLK}$ is below bulk-lower-threshold pressure $P_{BLKLT}$ there is sufficient time to start engine 140 and then to switch from bulk-fuel supply 20 to booster-fuel supply 30. In step 225 booster-shutoff valve 50 is closed to disable flow of fuel from booster-fuel supply 30 (if it is not already closed) and bulk-shutoff valve 40 is opened to enable flow of fuel from bulk-fuel supply 20 (if it is not already opened). Step 225 ensures fuel is drawn from bulk-fuel supply 20 after it is determined the bulk-fuel supply has sufficient fuel and a part of algorithm 200 that primarily fuels from bulk-fuel supply 20 is entered. As will be explained in more detail below there is a part of algorithm 200 that primarily fuels from booster-fuel supply 30.

Proceeding to step 230 accumulator pressure $P_A$ is compared to an accumulator-threshold pressure $P_{AT}$ and as soon as accumulator pressure $P_A$ is less than or equal to the accumulator-threshold pressure $P_{AT}$ the algorithm proceeds to step 235, otherwise algorithm 200 holds in step 230 until this condition is met. Accumulator pressure $P_A$ drops when gaseous-fuel system 10 cannot keep up with fuel demand from internal combustion engine 140 when drawing fuel from bulk-fuel supply 20, and when accumulator pressure $P_A$ drops too much, extra measures need to be taken to maintain accumulator pressure $P_A$ at a desired level (particularly accumulator-threshold pressure $P_{AT}$) or within a desired range. In an exemplary embodiment, accumulator-threshold pressure $P_{AT}$ is a function of engine fuel-demand, where engine fuel-demand is a function of power, and where power is a function of engine speed and engine torque. For example, as engine fuel-demand increases (such as when an operator further depresses a fuel pedal) accumulator-threshold pressure $P_{AT}$ can correspondingly increase, which allows more time for gaseous-fuel system 10 to react to increased fuel-demand in the event accumulator pressure $P_A$ is dropping. Alternatively, or additionally, accumulator-threshold pressure $P_{AT}$ can be a function of bulk pressure $P_{BLK}$ in bulk-fuel supply 20, where the lower the bulk pressure $P_{BLK}$, the higher the accumulator-threshold pressure $P_{AT}$ will be set. The time it takes to pressurize gaseous fuel from bulk-fuel supply 20 to a particular threshold (in the event it needs to be pressurized) is inversely related to bulk pressure $P_{BLK}$.

The transition from step 230 to step 235 represents a first escalation in algorithm 200 where gaseous-fuel system 10 takes a first extra measure to meet fuel-demand of engine 140. In step 235, compressor valve 80 is opened and compressor 70 is started to enable compressor pressurization of gaseous fuel coming from check valve 60, while compressor-bypass valve 90 is closed as the compressor is started. Proceeding to step 240, and after a first time-delay (that can also be a function of engine fuel-demand and/or bulk pressure $P_{BLK}$), accumulator pressure $P_A$ is again compared to accumulator-threshold pressure $P_{AT}$. In the event accumulator pressure $P_A$ is greater than accumulator-threshold pressure $P_{AT}$ (that is, accumulator pressure $P_A$ has been restored to the desired value or range) algorithm 200 proceeds to step 245 where compressor 70 is stopped, compressor valve 80 is closed and bypass valve 90 is opened such that fuel from bulk-fuel supply 20 is supplied directly to accumulator 100, and control then returns to step 220. The transition from step 240 to step 245 represents a first de-escalation in algorithm 200 where gaseous-fuel system 10 removes the first extra measure to meet fuel-demand of engine 140.

Returning to step 240, in the event accumulator pressure $P_A$ is less than or equal to accumulator-threshold pressure $P_{AT}$, control passes to step 250 where bulk-shutoff valve 40 is closed (to stop gaseous fuel flow from bulk-fuel supply 20) and booster-shutoff valve 50 is opened (to enable gaseous fuel flow from booster-fuel supply 20), after which control passes to step 255 after a second time-delay (that can be a function of engine fuel-demand and/or booster pressure $P_{BSTR}$). It should be noted that the switch from bulk-fuel supply 20 to booster-fuel supply 30 is only done if booster pressure $P_{BSTR}$ is greater than bulk pressure $P_{BLK}$, otherwise there is no motivation to make the switch. For clarity, the check for this condition is not illustrated in algorithm 200 of FIG. 2. During typical operation of engine 140, booster-fuel supply 30 is employed for brief periods of large or excessive fuel demand from the engine that typically are short in duration such that booster pressure $P_{BSTR}$ does not diminish significantly, although it is possible that atypical long durations of excessive fuel demand occur. As will be described in subsequent embodiments, it is possible to periodically recharge booster-fuel supply 30 during operation of engine 140. The transition from 240 to step 250 represents a second escalation in algorithm 200 where gaseous-fuel system 10 takes a second extra measure to meet fuel-demand of engine 140. The first extra measure is switching on compressor 70 to increase the pressure delivered from bulk-fuel supply 20, and the second measure is switching from bulk-fuel supply 20 to booster-fuel supply 30 while maintaining the operation of compressor 70. Typically, booster pressure $P_{BSTR}$ is greater than bulk pressure $P_{BLK}$, accordingly it takes less time to pressurize the gaseous fuel from booster-fuel supply 30.

Proceeding to step 255 accumulator pressure $P_A$ is compared to the accumulator-threshold pressure $P_{AT}$ and as soon as accumulator pressure $P_A$ is greater than the accumulator-threshold pressure $P_{AT}$ the algorithm proceeds to step 260, otherwise algorithm 200 holds in step 255 until this condition is met. In those circumstances with atypically large or excessive fuel demand from engine 140, it is possible that the condition of step 255 is never met and booster pressure $P_{BSTR}$ in booster-fuel supply 30 continues to deplete to and below a booster-lower-threshold pressure $P_{BSTRLT}$. Booster-shutoff valve 50 can be closed and bulk-shutoff valve 40 can be opened when booster pressure $P_{BSTR}$ is less than or equal to booster-lower-threshold pressure $P_{BSTRLT}$, although for clarity the check for this circumstance is not illustrated in algorithm 200 of FIG. 2. In step 260, the second extra measure is removed by closing the booster-shutoff valve 50 to disable flow of fuel from booster-fuel supply 30 and opening bulk-shutoff valve 40 to enable flow of fuel from bulk-fuel supply 20, while compressor 70 remains operational. The transition from step 255 to step 260 represents a second de-escalation in algorithm 200 where gaseous-fuel system 10 removes the second extra measure to meet the fuel-demand of engine 140.

Proceeding now to step 265, and after a third time-delay (that can also be a function of engine fuel-demand and/or bulk pressure $P_{BLK}$), accumulator pressure $P_A$ is again compared to accumulator threshold pressure $P_{AT}$. In the event accumulator pressure $P_A$ is greater than accumulator-threshold pressure $P_{AT}$ (that is, accumulator pressure $P_A$ has been restored to the desired value or range) algorithm 200 proceeds to step 245 where compressor 70 is stopped, compressor valve 80 is closed and bypass valve 90 is opened, and control then returns to step 220. Returning to step 265, in the event accumulator pressure $P_A$ is less than or equal to accumulator-threshold pressure $P_{AT}$, control passes to step 250 where bulk-shutoff valve 40 is closed (to stop gaseous fuel flow from bulk-fuel supply 20) and booster-shutoff valve 50 is opened (to enable gaseous fuel flow from booster-fuel supply 20), after which control passes to step 255 after the second time-delay. The transition from 265 to step 250 also represents the second escalation in algorithm 200 where gaseous-fuel system 10 takes the second extra measure to meet fuel-demand of engine 140. The transition from step 265 to step 245 also represents the first de-escalation where gaseous-fuel system 10 removes the first extra measure to meet fuel-demand of engine 140. Notably, in other embodiments the algorithm can transition from step 255 to step 260 and then directly to step 245 whereby the first de-escalation and the second de-escalation are caried out sequentially.

Returning to step 270, when algorithm 200 has determined that bulk pressure $P_{BLK}$ is less than or equal to bulk-lower-threshold pressure $P_{BLKLT}$ the following steps are taken. In step 270 bulk-shutoff valve 40 is closed (to stop gaseous fuel flow from bulk-fuel supply 20), and booster-shutoff valve 50 is opened (to enable gaseous fuel flow from booster-fuel supply 20), since it has been determined in step 220 that there is insufficient fuel in bulk-fuel supply 20 for internal combustion engine 140 to operate at least at the current engine speed and engine load. Control passes to step 275 after a fourth time-delay (that can be a function of engine fuel-demand and/or booster pressure $P_{BSTR}$).

Proceeding to step 275 accumulator pressure $P_A$ is compared to an accumulator-threshold pressure $P_{AT}$ and as soon as accumulator pressure $P_A$ is less than or equal to the accumulator-threshold pressure $P_{AT}$ the algorithm proceeds to step 280, otherwise algorithm 200 holds in step 275 until this condition is met. Accumulator pressure $P_A$ drops when gaseous-fuel system 10 cannot keep up with fuel demand from internal combustion engine 140 when drawing fuel from booster-fuel supply 30, and when accumulator pressure $P_A$ drops too much, extra measures need to be taken to maintain accumulator pressure $P_A$ at the desired value or within the desired range. The transition from step 275 to step 280 represents a third escalation in algorithm 200 where gaseous-fuel system 10 takes a third extra measure to meet fuel-demand of engine 140.

In step 280, compressor valve 80 is opened and compressor 70 is started to enable compressor pressurization of gaseous fuel coming from check valve 60, while compressor-bypass valve 90 is closed as the compressor is started. Proceeding to step 285, and after a fifth time-delay (that can also be a function of engine fuel-demand and/or bulk pressure $P_{BLK}$), accumulator pressure $P_A$ is again compared to accumulator-threshold pressure $P_{AT}$. In the event accumulator pressure $P_A$ is greater than accumulator-threshold pressure $P_{AT}$ (that is, accumulator pressure $P_A$ has been restored to the desired value or within the desired range) algorithm 200 proceeds to step 290 where compressor 70 is stopped, compressor valve 80 is closed and bypass valve 90 is opened, and control then returns to step 220. The transition from step 285 to step 290 represents a third de-escalation in algorithm 200 where gaseous-fuel system 10 removes the third extra measure to meet fuel-demand of engine 140.

In the operation of algorithm 200 the circumstance may arise where accumulator pressure $P_A$ is greater than bulk pressure $P_{BLK}$ and bulk pressure $P_{BLK}$ is greater than bulk-lower-threshold pressure $P_{BLKLT}$. Under this circumstance when accumulator pressure is greater than accumulator-threshold pressure $P_{AT}$, supply-select valve apparatus 45 will select bulk-fuel supply 20 to supply the fuel; however, fuel will not flow from the bulk-fuel supply 20 to accumulator 100 until accumulator pressure $P_A$ drops below bulk pressure $P_{BLK}$. In the event bulk pressure $P_{BLK}$ is less than accumulator-threshold pressure $P_{AT}$, compressor 70 will be enabled before accumulator pressure $P_A$ declines below bulk pressure $P_{BLK}$ and under this circumstance, compressor 70 will create a positive pressure differential across check valve 60 allowing fuel to flow from bulk-fuel supply 20 to compressor 70.

It is noteworthy that gaseous-fuel system 10 can switch from primarily fueling with booster-fuel supply 30 (in step 270) to primarily fueling with bulk-fuel supply 20 (in step 225) when bulk pressure $P_{BLK}$ is restored above bulk-lower-threshold pressure $P_{BLKLT}$, for example in the event bulk-fuel supply 20 and booster-fuel supply 30 are refilled while engine 140 is operating (where this is permissible by regulations). In an exemplary embodiment the first, second, third, fourth and fifth time-delays can have the same time-delay value, however this is not a requirement and in other embodiments these time delays can have different time-delay values.

Figure 3:
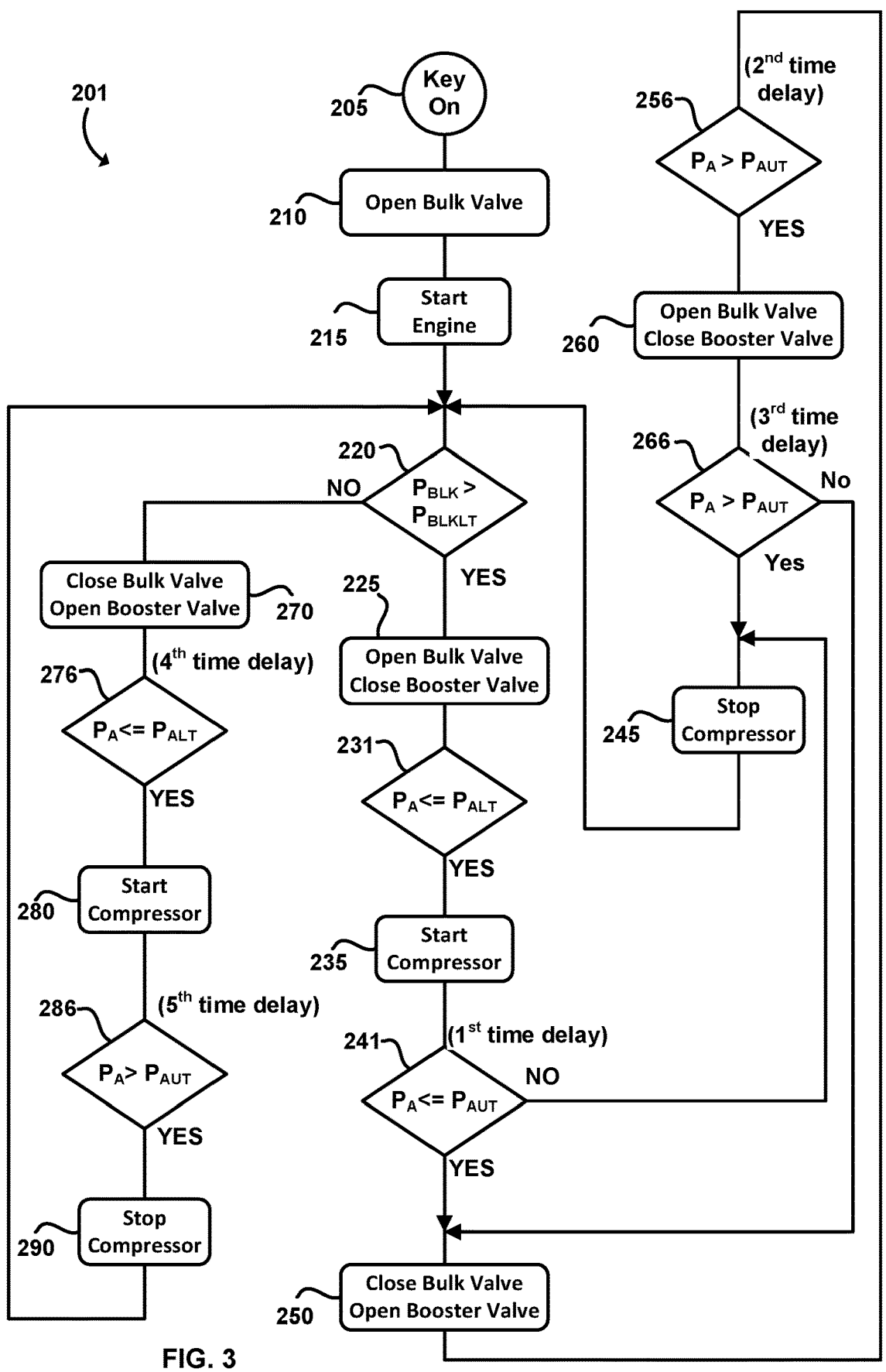
FIG. 3 is a flow chart view of a technique of operating the gaseous-fuel system of FIG. 1 according to another embodiment.

Referring now to FIG. 3 there is shown algorithm 201 according to another embodiment that can be programmed in controller 150 and is a technique of pressurizing and supplying the gaseous fuel for internal combustion engine 140, which is like algorithm 200 and like steps have like reference numerals and only the differences are discussed. Instead of a single threshold pressure (the accumulator-threshold pressure $P_{AT}$ seen in FIG. 2), algorithm 201 uses a range of accumulator threshold pressures defined by accumulator-lower-threshold pressure $P_{ALT}$ and accumulator-upper-threshold pressure $P_{AUT}$. In algorithm 201, the first and third escalations begin when the accumulator pressure $P_A$ drops below accumulator-lower-threshold pressure $P_{ALT}$, and the second escalation begins when the accumulator pressure $P_A$ remains below the accumulator-upper-threshold pressure $P_{AUT}$ after the first extra measure (turning on compressor 70) was taken to raise the accumulator pressure $P_A$ above the upper threshold; and the first, second and third de-escalations begin when the accumulator pressure rises above the accumulator-upper-threshold pressure $P_{AUT}$. More specifically, in steps 231 and 276 accumulator pressure $P_A$ is compared to accumulator-lower-threshold pressure $P_{ALT}$. In steps 241, 256, 266 and 286 accumulator pressure $P_A$ is compared to accumulator-upper-threshold pressure $P_{AUT}$. In an exemplary embodiment accumulator-lower-threshold pressure $P_{ALT}$ in algorithm 201 has the same value as accumulator-threshold pressure $P_{AT}$ in algorithm 200 and represents the accumulator pressure $P_A$ at which the first and second extra measures are taken (according to the logic in the algorithms) to maintain the pressure in the accumulator. In contrast to algorithm 200, algorithm 201 employs the accumulator-upper-threshold pressure $P_{AUT}$, which is greater than the accumulator-lower-threshold pressure $P_{ALT}$ and the accumulator-threshold pressure $P_{AT}$, to determine when the first and second extra measures are removed (according to the logic in algorithm 201). More generally, accumulator-lower-threshold pressure $P_{ALT}$ is equal to or less than the accumulator-upper-threshold pressure $P_{AUT}$. As with algorithm 200, algorithm 201 also includes checks on booster pressure $P_{BSTR}$ compared to bulk pressure $P_{BLK}$ in step 241 and to booster-lower-threshold pressure $P_{BSTRLT}$ in step 256.

Figure 4:
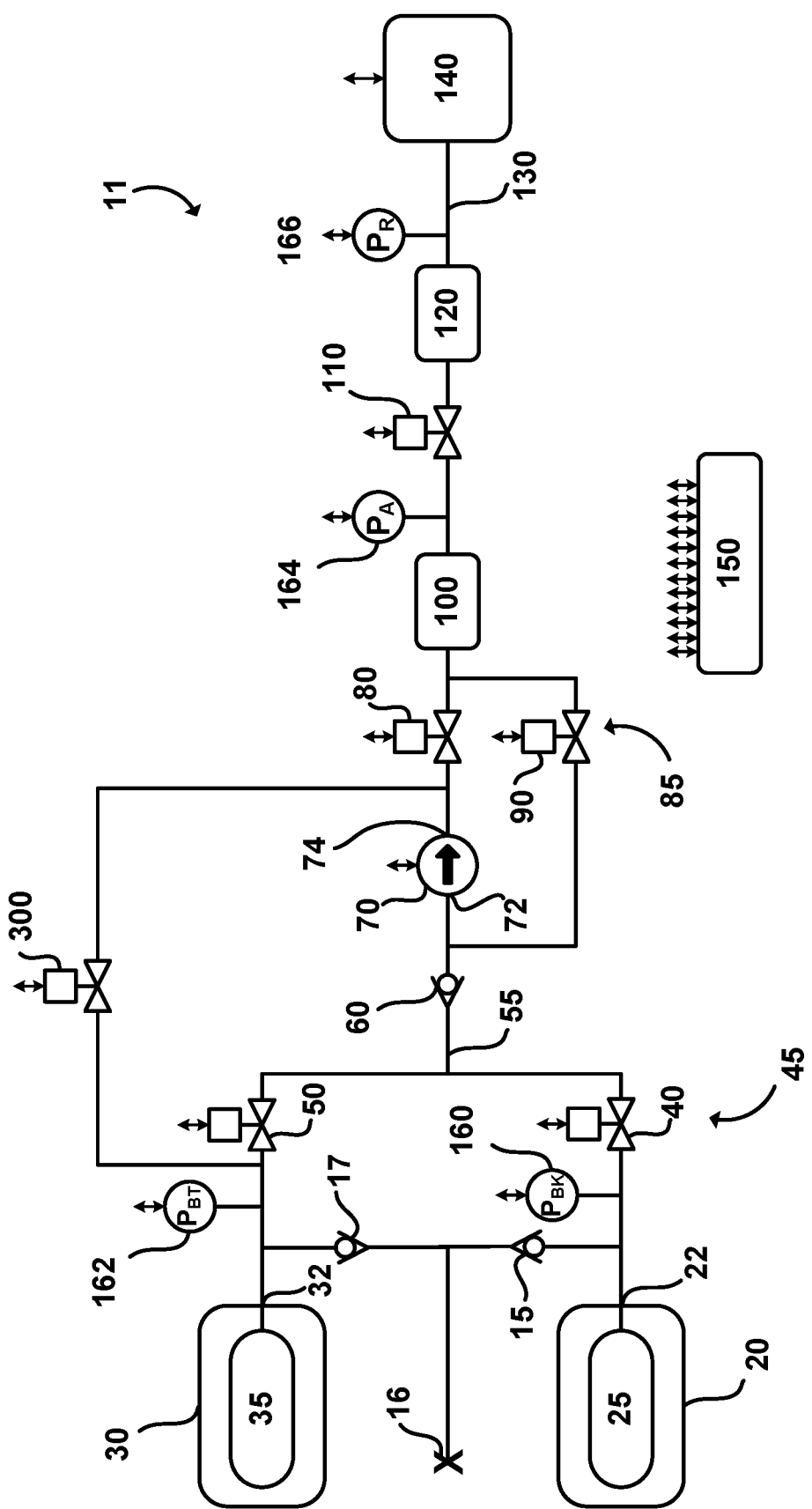
FIG. 4 is a schematic view of a gaseous-fuel system for pressurizing and supplying gaseous fuel to an internal combustion engine according to another embodiment.

Referring now to FIG. 4, a gaseous-fuel system 11 is shown according to another embodiment that is like the embodiment of FIG. 1 and like parts in this and other embodiments have like reference numerals and only differences are discussed. Gaseous-fuel system 11 allows for booster-fuel supply 30 to be pressurized with fuel from bulk-fuel supply 20 by employing compressor 70 to compress gaseous fuel from bulk-fuel supply 20 and redirecting the pressurized gaseous fuel to booster-fuel supply 30. Algorithms 200 and 201 in FIGS. 2 and 3 respectively can be operated with gaseous-fuel system 11. Returning to FIG. 4, recharging valve 300 connects outlet 74 of compressor 70 with inlet/outlet 32 of booster-fuel supply 30 to provide a fluid path for pressurized gaseous fuel from compressor 70 to be redirected to the booster-fuel supply. When booster-fuel supply 30 is to be recharged, controller 150 closes booster-shutoff valve 50, compressor valve 80 and bypass valve 90, opens bulk-shutoff valve 40 and recharging valve 300, and starts compressor 70 to pressurize gaseous fuel from bulk-fuel supply 20 and deliver the pressurized gaseous fuel to booster-fuel supply 30.

Figure 5:
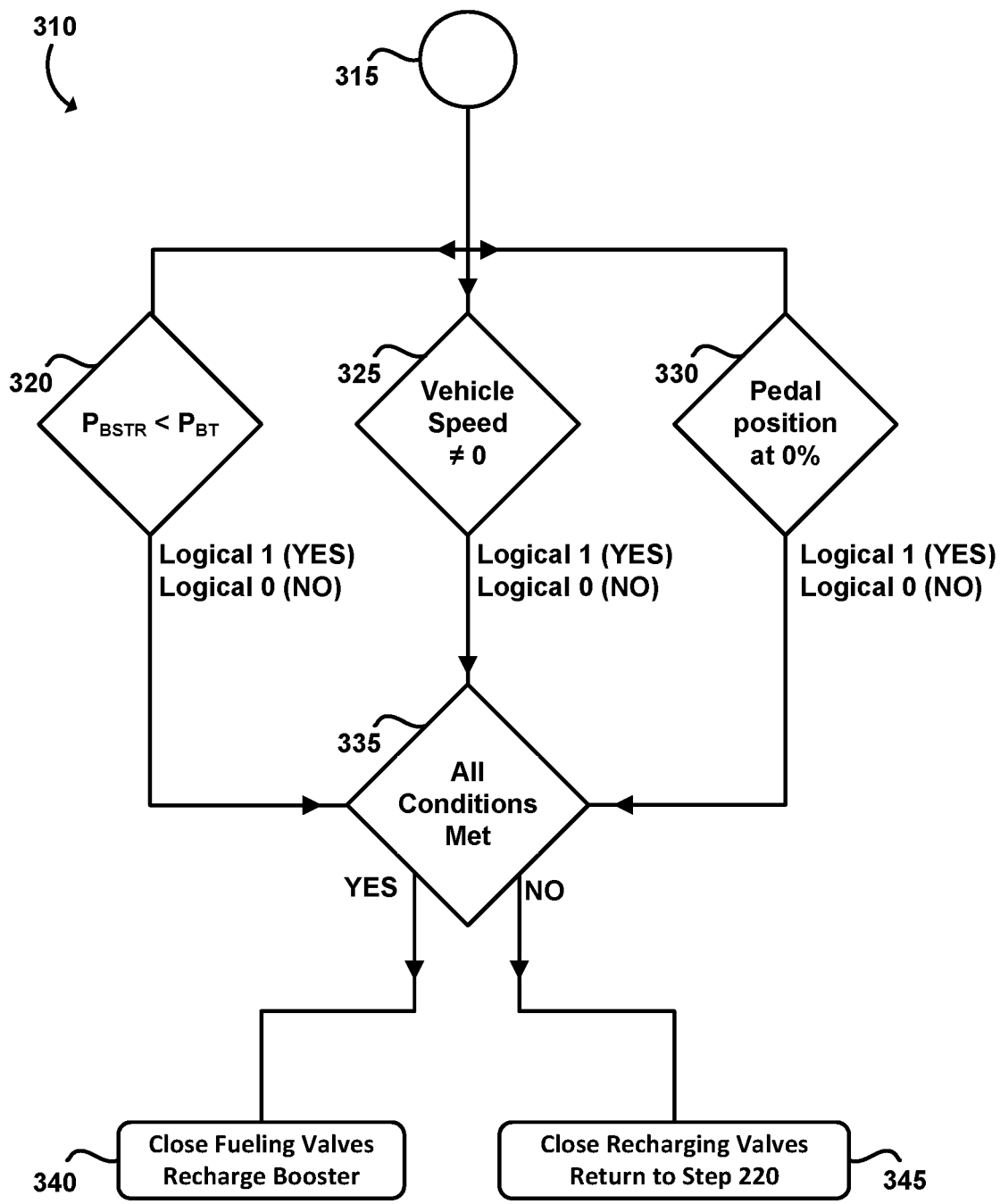
FIG. 5 is a flow chart view of a technique for pressurizing a booster-fuel supply from a bulk-fuel supply in the gaseous fuel system of FIG. 4.

Booster-fuel supply 30 can become depleted during operation of internal combustion engine 140 depending upon the conditions under which the engine has been operating. Referring now to FIG. 5, there is shown algorithm 310 that can be programmed in controller 150, and which is a technique for pressurizing booster-fuel supply 30 when internal combustion engine 140 is employed in a vehicle (not shown) to propel the vehicle. The technique begins in step 315 when engine 140 is started. In step 320 booster pressure $P_{BSTR}$ is monitored and compared to booster-threshold pressure $P_{BT}$ and when booster pressure $P_{BSTR}$ is less than booster-threshold pressure $P_{BT}$, step 320 outputs logical one to step 335, described in more detail below; otherwise, step 320 outputs logical zero. Booster-threshold pressure $P_{BT}$ is equal to a difference between the maximum rated pressure (the pressure booster vessel 35 can safely contain) less a safety margin. The booster-threshold pressure $P_{BT}$ can be greater than the upper storage threshold pressure $P_{UST}$, particularly when the upper storage threshold pressure $P_{UST}$ is equal to the maximum pressure the refueling station can provide but less than the maximum pressure permitted by local regulations. In algorithm 310, the logical one represents a YES condition and the logical zero represents the NO condition.

In step 325, vehicle speed is monitored and when the vehicle speed is not equal to zero, step 325 outputs logical one to step 335, otherwise step 325 outputs logical zero. Step 330 monitors a position of a pedal that is operated by a user for controlling the speed (by controlling the fueling) of the vehicle. In step 330 the position of the pedal is continuously monitored and when the pedal position is at zero percent (0%), representing a default position for the pedal where the pedal is not depressed at all and representing zero engine-fuel demand also known as a motoring condition, step 330 outputs logical one to step 335, otherwise step 330 outputs logical zero. Alternatively, or additionally, step 330 can monitor a position of a throttle (not shown) that controls air flow in engine 140 that can also indicate the zero engine-fuel demand, or any lever operated by the user for controlling speed and/or fueling. Steps 320, 325 and 330 are operating continuously and are continuously outputting respective logical one or logical zero values accordingly.

Proceeding to step 335, all outputs of steps 320, 325 and 330 are continuously monitored and when all these outputs are logical ones, step 335 proceeds to step 340, otherwise step 335 proceeds to step 345. That is, when the booster pressure $P_{BSTR}$ is less than the booster-threshold pressure $P_{BT}$, the vehicle speed is not equal to zero and the pedal position is at 0% then step 340 is entered where booster-fuel supply 30 is recharged, otherwise step 345 is entered that returns control to algorithms 200 or 201 by entering step 220 (seen in FIGS. 2 and 3). More particularly, when step 340 is entered, booster-shutoff valve 50, compressor valve 80 and bypass valve 90 are closed, bulk-shutoff valve 40 and recharging valves 300 are opened and compressor 70 is started such that booster pressure $P_{BT}$ can be elevated above booster-threshold pressure $P_{BSTR}$. When step 345 is entered booster-shutoff valve 50, compressor valve 80 and recharging valve 300 are closed, bulk-shutoff valve 40 and bypass valve 90 are opened and compressor 70 is stopped, after which control returns to step 220 in either algorithm 200 or 201 (seen in FIGS. 2 and 3 respectively). Step 345 is conducted when there is a transition from the conditions in step 335 being met to the conditions not being met, since after step 345 is completed, control of the components in gaseous-fuel system 10 returns to algorithms 200 or 201. The operation of compressor 70 under the conditions of recharging, particularly the conditions of steps 325 and 330 (where the vehicle speed is not zero and the pedal position is at 0%), reduces parasitic losses by employing the momentum in the vehicle to drive the compressor and provides additional braking force for the vehicle thereby reducing brake pad wear, which improves the total cost of ownership of the system.

Figure 6:
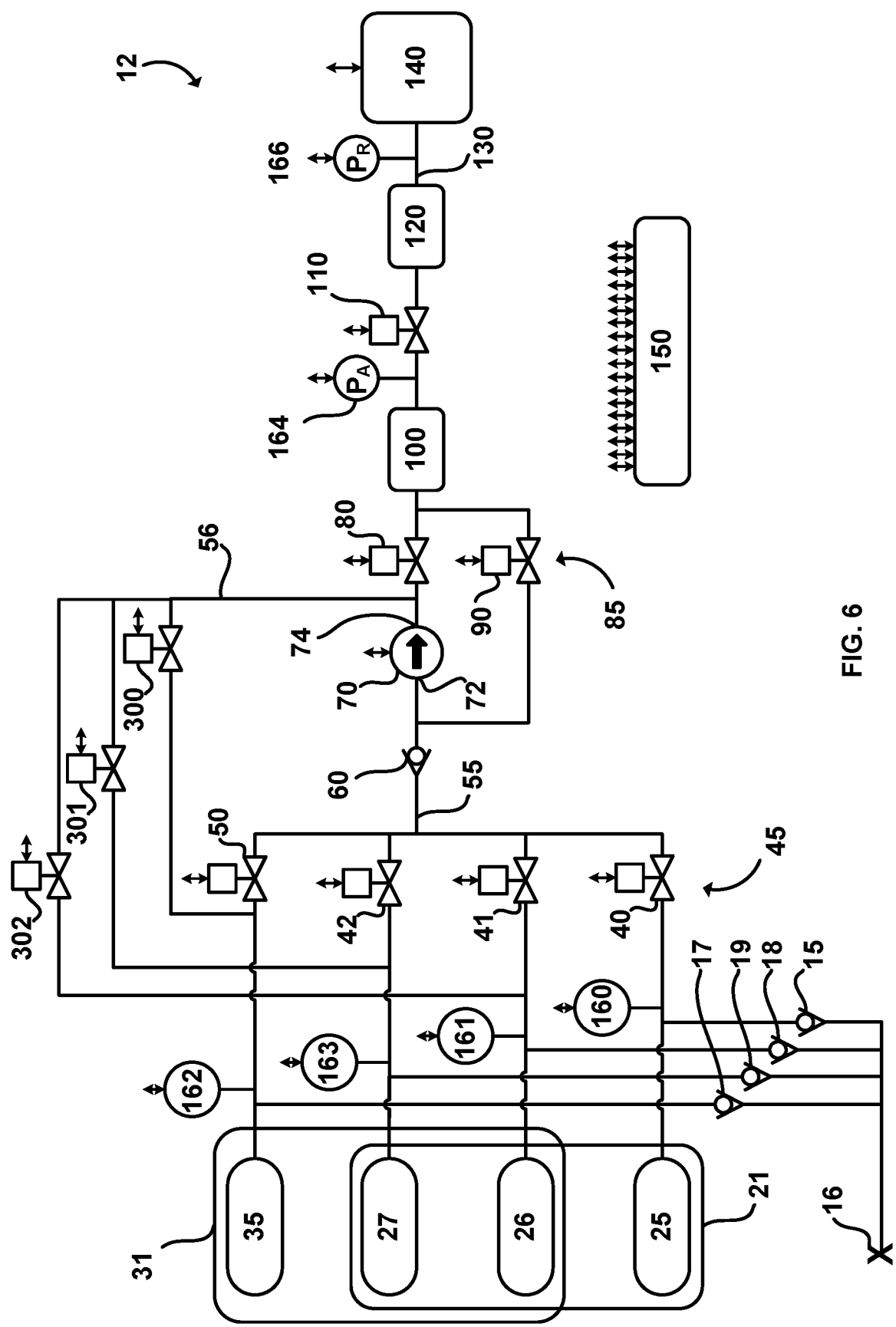
FIG. 6 is a schematic view of a gaseous-fuel system for pressurizing and supplying gaseous fuel to an internal combustion engine according to another embodiment.

Referring now to FIG. 6, gaseous-fuel system 12 is illustrated according to another embodiment. Bulk-fuel supply 21 and booster-fuel supply 31 both comprise vessels 26 and 27, that are each like vessels 25 and 35 and store the gaseous fuel. As will be seen below, both vessels 26 and 27 are dynamically assigned to either the bulk-fuel supply 21 or the booster-fuel supply 31. Each vessel 25, 26, 27 and 35 has a corresponding shut-off valve 40, 41, 42 and 50 respectively, associated pressure sensors 160, 161, 163 and 162 respectively and refueling check valves 15, 18, 19 and 17, respectively. Similarly, vessels 26, 27 and 35 have associated recharging valves 302, 301 and 300, respectively. In alternative embodiments, instead of pressure sensors 160, 161, 162 and 163, or in addition to, there can be a first pressure sensor sensing pressure in delivery pipe 55 and a second pressure sensor sensing pressure in conduit 56 when recharging vessels 26, 27 and 35.

Figure 7:
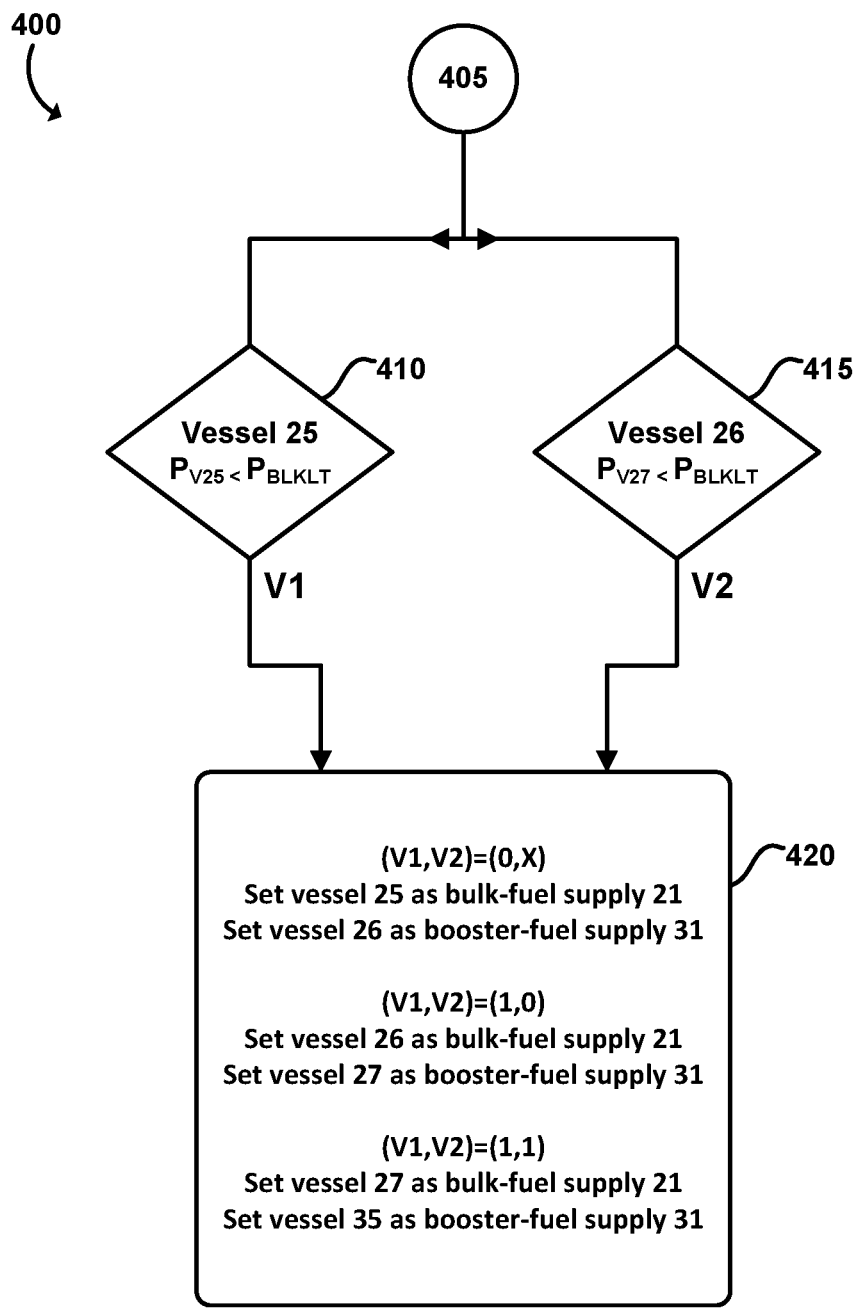
FIG. 7 is a flow chart view of a technique for selecting vessels in the gaseous-fuel system of FIG. 6.

With reference to FIG. 7, the operation of gaseous-fuel system 12 is now discussed according to algorithm 400 that can be programmed in controller 150, and that is a technique of selecting which of vessels 25, 26, 27 and 35 are selected. Algorithm 400 can be conducted in parallel and/or in series to algorithms 200 and 201 seen in FIGS. 2 and 3, respectively. For example, and as described in more detail below, step 405 can be entered repetitively and periodically after internal combustion engine 140 is started, after a predetermined time interval has elapsed. Alternatively, or additionally, step 405 can be entered upon entry to any of the steps in algorithms 200 or 201 seen FIGS. 2 and 3 respectively as a prerequisite to conducting those steps.

Step 410 determines whether a pressure $P_{V25}$ inside vessel 25 is less than bulk-lower-threshold pressure $P_{BLKLT}$, and when pressure $P_{V25}$ is less then pressure $P_{BLKLT}$ step 410 outputs status signal V1 as a logical one otherwise it outputs status signal V1 as a logical zero. Similarly, step 415 determines whether a pressure $P_{V26}$ inside vessel 26 is less than bulk-lower-threshold pressure $P_{BLKLT}$, and when pressure $P_{V26}$ is less then pressure $P_{BLKLT}$ step 415 outputs status signal V2 as a logical one otherwise it outputs status signal V2 as a logical zero. The status signals V1 and V2 are input into step 420 that based on these status signals assigns one of the vessels 25, 26 and 27 as bulk-fuel supply 21 and one of the vessels 26, 27 and 35 as booster-fuel supply 31. More particularly, when status signal V1 is a logical zero indicating vessel 25 is not empty then vessel 25 is set as the bulk-fuel supply 21 and vessel 26 is automatically set as booster-fuel supply 31. In this circumstance the values of status signal V2 does not matter. When status signal V1 is a logical one and status signal V2 is a logical zero indicating vessel 25 is empty and vessel 26 is not empty, then vessel 26 is set as the bulk-fuel supply 21 and vessel 27 is set as booster-fuel supply 31. When status signals S1 and S2 are a logical one indicating vessels 25 and 26 are empty then vessel 27 is set as the bulk-fuel supply 21 and vessel 35 is set as booster-fuel supply 31.

After step 420, control returns to step 220 in algorithm 200 or algorithm 201 such that the determination of whether bulk pressure $P_{BLK}$ is greater than bulk-lower-threshold pressure $P_{BLKLT}$ can be made. Note that when vessel 26 is designated the bulk-fuel supply 21, the shut-off valve 41 is the bulk-shut-off valve, and when vessel 26 is designated the booster-fuel supply 21 the shut-off valve 41 is the booster-shut-off valve referred to in algorithms 200 and 201. Similarly, when vessel 27 is designated the bulk-fuel supply 21 the shut-off valve 42 is the bulk-shut-off valve, and when vessel 27 is designated the booster-fuel supply 21 the shut-off valve 42 is the booster-shut-off valve referred to in algorithms 200 and 201. Shut-off valves 40, 41, 42, and 50 remain closed when respective vessels 25, 26, 27 and 35 are not designated as the bulk-fuel supply or the booster-fuel supply according to the above disclosure. The current designations of which of the vessels 25, 26 and 27 is the bulk-fuel supply 21 and which of the vessels 26, 27 and 35 is the booster-fuel supply 31 can be retained in a permanent memory of controller 150, such that when the internal combustion engine 140 starts up, algorithms 200 or 201 can then know which of the bulk-shut-off valves to open in step 210 of these algorithms (seen in FIGS. 2 and 3).

The fuel economy of internal combustion engine 140 improves when gaseous-fuel system 12 is operated according to algorithm 400 compared to when the bulk-fuel supply and the booster-fuel supply are static where vessels are not dynamically assigned. In alternative embodiments, more than one of vessels 25, 26, and 27 can be assigned to bulk-fuel supply 21 to operate concurrently and simultaneously in parallel and more than one of vessels 26, 27 and 35 can be assigned to booster-fuel supply 31 to operate concurrently and simultaneously in parallel. For example, controller 150 can collect statistics on how often steps in algorithms 200 and 201 are conducted and based on this statistical information can determine a volume ratio between a volume of the bulk-fuel supply to the booster-fuel supply that improves fuel utilization and fuel economy.

Figure 9:
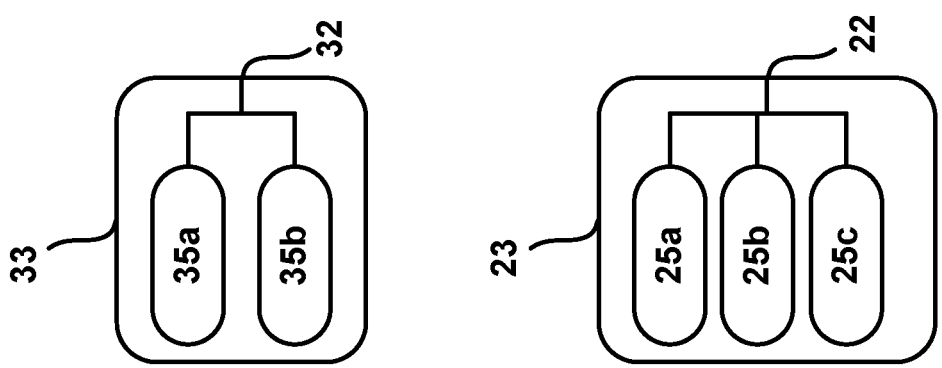
FIG. 9 is a schematic view of a bulk-fuel supply and a booster-fuel supply according to another embodiment.
Figure 8:
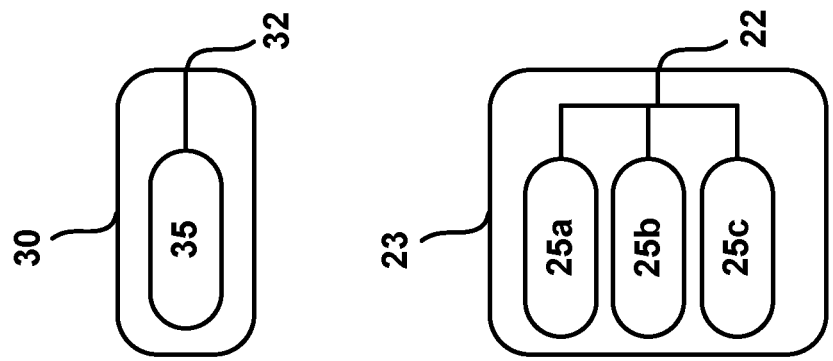
FIG. 8 is a schematic view of a bulk-fuel supply and a booster-fuel supply according to another embodiment.

With reference to FIGS. 1 and 4, bulk-fuel supply 20 and booster-fuel supply 30 can have more than one bulk vessel and booster vessel respectively in other embodiments. Referring now to FIG. 8, bulk-fuel supply 23 has three bulk vessels 25a, 25b and 25c and booster-fuel supply 30 has one booster vessel 35, which is an exemplary embodiment of a volumetric ratio of at least 3 to 1 between a volume of bulk-fuel supply 23 versus a volume of booster-fuel supply 30 (where all vessels 25a, 25b, 25c and 35 have the same volume). With reference to FIG. 9, bulk-fuel supply 23 has three bulk vessels 25a, 25b and 25c while booster-fuel supply 33 has two booster vessels 35a and 35b. In still further embodiments the number of bulk vessels and booster vessels is not limited other than by practical considerations of where to place them on the vehicle or in a facility when employed in standalone applications. Bulk-fuel supply 23 can employ bulk-shutoff valve 40 and booster-fuel supply 33 can employ booster-shutoff valve 50 (seen in FIGS. 1 and 4). Alternatively, each bulk vessel 25a, 25b, 25c and 25d and booster vessel 35a and 35b can have its own shutoff valve (that are like valves 40 and 50 and controlled by controller 150). In other embodiments, there can be multiple groupings of vessels and multiple valves scheduled in an intelligent way based on a mathematical model to maximize range while minimizing power consumption from the compressor.

Figure 10:
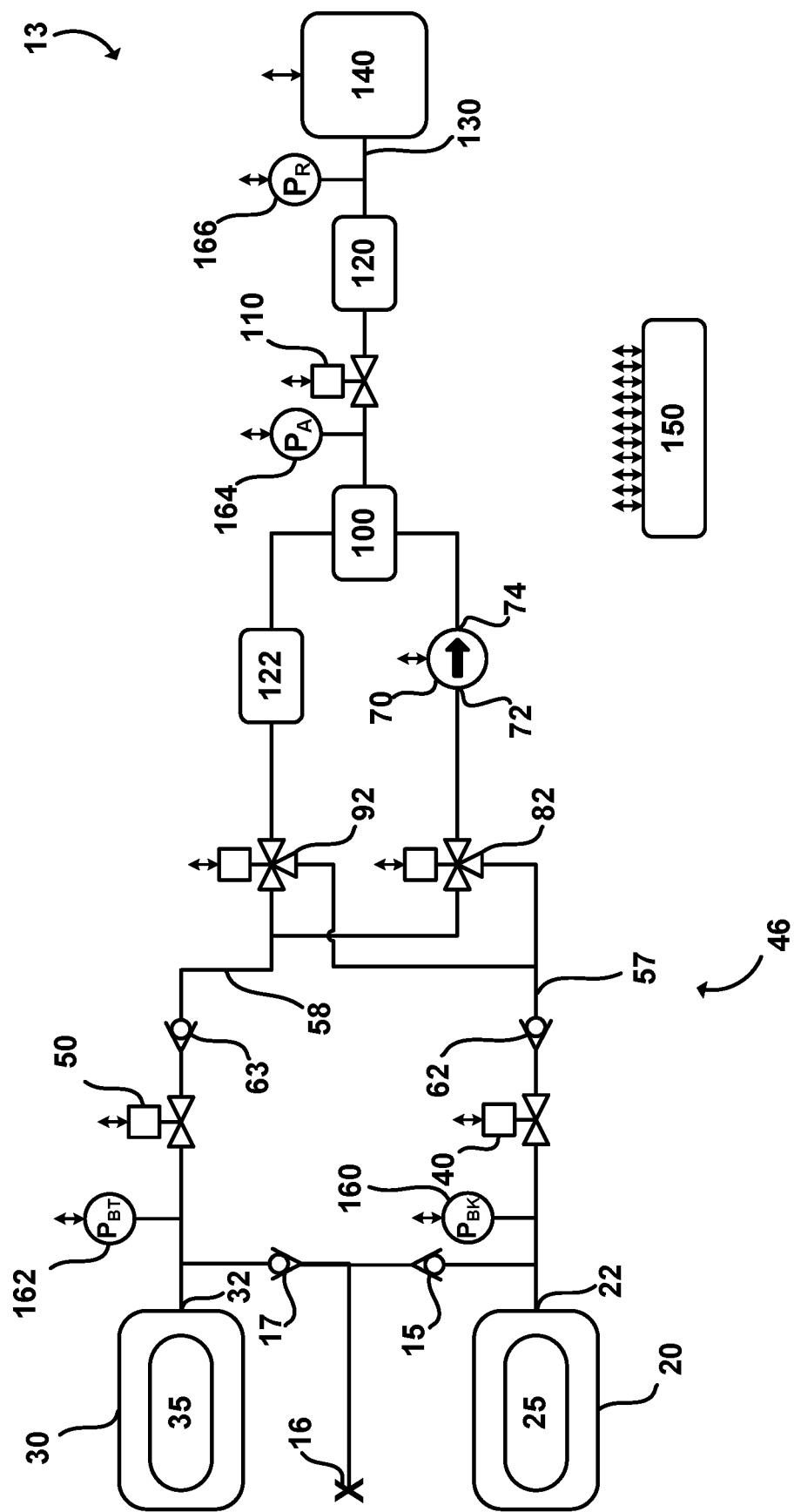
FIG. 10 is a schematic view of a gaseous-fuel system for pressurizing and supplying gaseous fuel to an internal combustion engine according to another embodiment.

Referring now to FIG. 10, gaseous-fuel system 13 is shown according to another embodiment that is like the embodiment of FIG. 1 and differences therewith are discussed. Supply-select apparatus 46 includes three-way valves 82 and 92 associated with bulk-fuel supply 20 and booster-fuel supply 30, respectively, in addition to shut-off valves 40 and 50. In other embodiments the three-way valves 82 and 92 can also function as shut-off valves such that the shut-off valves 40 and 50 are not required. As used herein, two-way valves and three-way valves are defined by the number of ports they use, whereby a two-way valve employs two ports, and a three-way valve employs three ports. The illustrated embodiment does not include a compressor-select apparatus since the functionality of fluidly communicating gaseous fuel from either of supplies 20 and 30 has been incorporated into three-way valves 82 and 92. Three-way valve 82 fluidly connects either bulk-fuel supply 20 or booster-fuel supply 30 to compressor 70. Three-way valve 92 fluidly connects bulk-fuel supply 20 or booster-fuel supply 30 to regulator 122. In the illustrated embodiment, accumulator 100 can be configured to fluidly receive gaseous fuel from compressor 70 and pressure regulator 122, where accumulator 100 is downstream from compressor 70 and pressure regulator 122, whereby gaseous fuel can flow from compressor 70 into accumulator 100 whenever there is a pressure differential between an output pressure of compressor 70 and accumulator pressure $P_A$, and gaseous fuel can flow from regulator 122 into accumulator 100 whenever there is a pressure differential between an output pressure of regulator 122 and accumulator pressure $P_A$. Three-way valve 92 operates as a compressor-bypass valve for gaseous fuel from bulk-supply 20 or booster-supply 30 (that is, either gaseous fuel from bulk-fuel supply 20 or from booster-fuel supply 30 is bypassed around compressor 70 but not gaseous-fuel from both supplies at the same time). Three-way valve 82 operates as a compressor valve for gaseous fuel from bulk-supply 20 or booster-supply 30 (that is, either gaseous fuel from bulk-fuel supply 20 or from booster-fuel supply 30 is supplied to compressor 70 but not gaseous-fuel from both supplies at the same time). Gaseous fuel from bulk-fuel supply 20 can be delivered to accumulator 100 in a parallel path to the gaseous fuel delivered from booster-fuel supply 30 to accumulator 100, as will be explained in more detail below, and for this reason separate check valves 62 and 63 can be employed to reduce and preferably prevent any fluid downstream from these check valves from returning towards bulk-fuel supply 20 and booster-fuel supply 30, respectively. In contrast, gaseous-fuel systems 10, 11, and 12 in the embodiments of FIGS. 1, 4, and 6, respectively, deliver gaseous-fuel from either bulk-fuel supply 20 or booster-fuel supply 30 to accumulator 100 through common check valve 60. Returning to FIG. 10, the gaseous fuel is delivered to regulator 122 when gaseous fuel from either supply 20 or 30 is bypassed around compressor 70. Regulator 122 regulates a pressure of the gaseous fuel in accumulator 100 to a desired value, such as accumulator-lower-threshold pressure $P_{ALT}$. Pressure regulator 122 can be a mechanical regulator that does not require control by controller 150, or alternatively pressure regulator 120 can be an electronic regulator that can be controlled by controller 150. In other embodiments, three-way valves 82 and 92 can also operate as shut-off valves for bulk-fuel supply 20 and booster-fuel supply 30 such that shut-off valves 40 and 50 are not required. For example, to shut-off bulk-fuel supply 20, three-way valves 82 and 92 are configured to fluidly disconnect conduit 57 from compressor 70 and regulator 122, and to shut-off booster-fuel supply 30, three-way valves 82 and 92 are configured to fluidly disconnect conduit 58 from compressor 70 and regulator 122. To shut-off bulk-fuel supply 20 and booster-fuel supply 30 simultaneously from compressor 70 and regulator 122, three-way valves 82 and 92 are configured in a closed state that does not provide fluid communication therethrough along any path.

Figure 11:
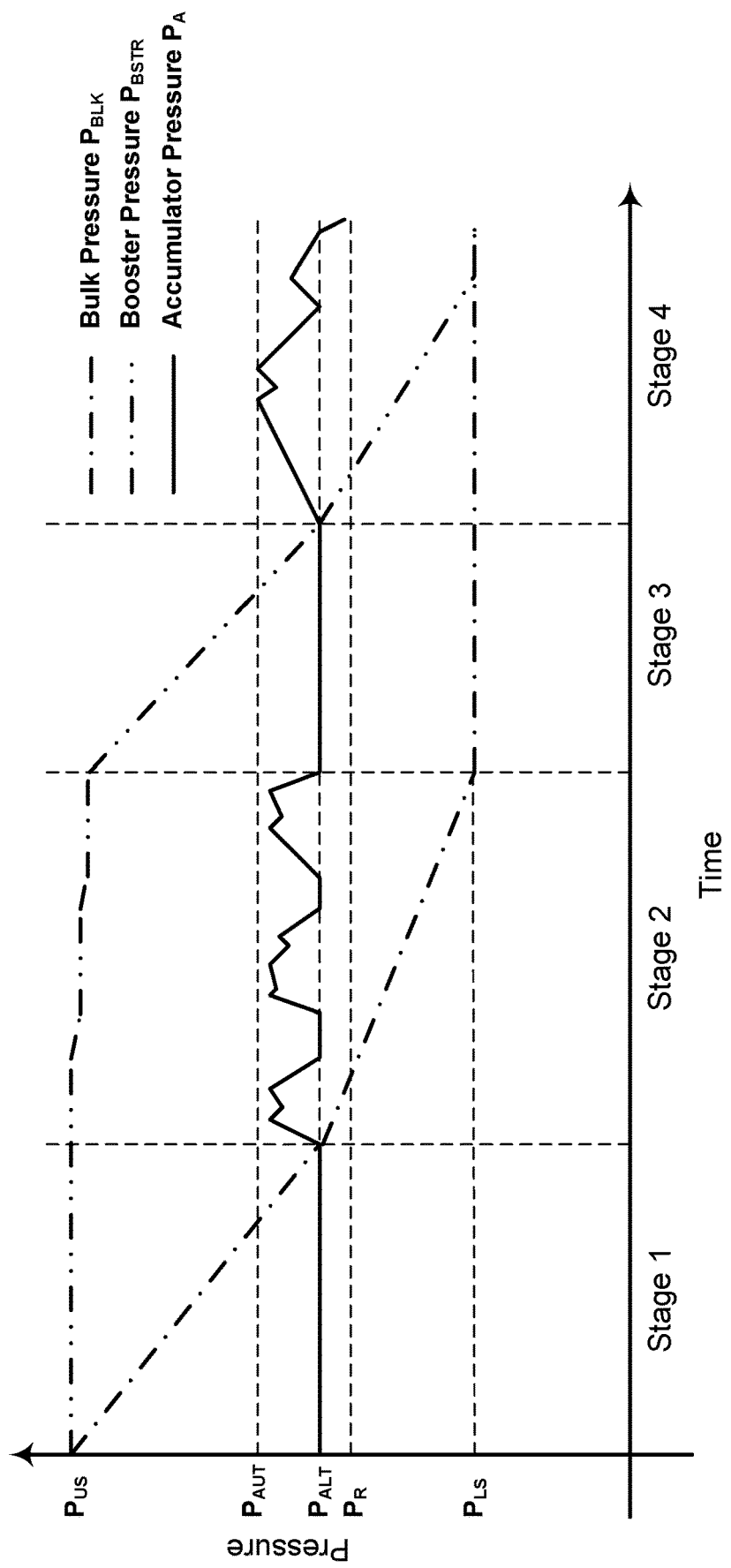
FIG. 11 is a chart view of gaseous fuel pressure in various components of the gaseous-fuel system of FIG. 10.

With reference to both FIGS. 10 and 11, gaseous-fuel system 13 (seen in FIG. 10) can be operated in four distinct stages (seen in FIG. 11). At the beginning of stage 1, bulk-fuel supply 20 and booster-fuel supply 30 are at a full vessel pressure, such as upper storage threshold pressure $P_{UST}$, where in exemplary embodiments the full vessel pressure can be equal to 350 bar or 700 bar. In this circumstance, gaseous fuel is supplied to accumulator 100 from bulk-fuel supply 20 through regulator 122, and gaseous fuel from booster-fuel supply 30 is not required and fluidly disconnected and isolated from accumulator 100. Accordingly, during stage 1 shut-off valve 40 is open, shut-off valve 50 is closed, three-way valve 92 fluidly connects conduit 57 to regulator 122, three-way valve 82 is closed or connects conduit 58 to compressor 70. Compressor 70 is inactivated and off during stage 1 since bulk pressure $P_{BLK}$ is higher than accumulator-lower-threshold pressure $P_{ALT}$ such that the gaseous fuel from bulk-fuel supply 20 does not need to be compressed. With reference to FIG. 10, recall that engine 140 is supplied gaseous fuel in fuel rail 130 where rail pressure $P_R$ can be equal to upper-desired-rail pressure $P_{UDR}$ such that fuel injection can occur at a desired injection pressure, and rail pressure $P_R$ is regulated by pressure regulator 120 that requires accumulator pressure $P_A$ to be at least equal to accumulator-lower-threshold pressure $P_{ALT}$ Such that rail pressure $P_R$ can be maintained at upper-desired-rail pressure $P_{UDR}$. Referring back to FIG. 11, stage 2 is entered when bulk pressure $P_{BLK}$ drops below accumulator-lower-threshold pressure $P_{ALT}$. During stage 2, bulk-fuel supply 20 is fluidly connected to accumulator 100 through compressor 70, and booster-fuel supply 30 is fluidly connected to accumulator 100 through regulator 122. Accordingly, both bulk-fuel shutoff valve 40 and booster-fuel shutoff valve 50 are open, three-way valve 82 fluidly connects conduit 57 with compressor 70, and three-way valve 92 fluidly connects conduit 58 to regulator 122. Gaseous fuel is primarily supplied to accumulator 100 from bulk-fuel supply 20 through compressor 70 during stage 2. In exemplary embodiments, compressor 70 can be undersized such that there may be periods during stage 2 when engine demand is greater than a maximum compressor flow for an extended period whereby accumulator pressure $P_A$ drops below accumulator-lower-threshold pressure $P_{ALT}$. In this circumstance, when accumulator pressure $P_A$ drops below accumulator-lower-threshold pressure $P_{ALT}$, gaseous fuel will be supplied from booster-fuel supply 30 through regulator 122 to accumulator 100 to increase accumulator pressure $P_A$ to at least accumulator-lower-threshold pressure $P_{ALT}$. As used herein engine demand refers to an instantaneous mass flow rate of fuel consumed in engine 140, and the maximum compressor flow refers to a maximum instantaneous mass flow rate of compressed gaseous fuel from compressor 70. The delivery of gaseous fuel from booster-fuel supply 30 to accumulator 100 during stage 2 can be referred to as a toping up of fuel in the accumulator. As can be seen in FIG. 11, accumulator pressure $P_A$ can be increased above accumulator-lower-threshold pressure $P_{ALT}$ during stage 2, which is caused by surges of gaseous fuel pressure coming from compressor 70 due to the compression of the gaseous fuel from bulk-fuel supply 20. Preferably, accumulator pressure $P_A$ does not increase above accumulator-upper-threshold pressure $P_{AUT}$ because of these surges. Compressor 70 can command controller 150 to maintain accumulator pressure $P_A$ greater than accumulator-lower-threshold pressure $P_{ALT}$ and less than or equal to accumulator-upper-threshold pressure $P_{AUT}$ such that gaseous fuel is primarily drawn from bulk-fuel supply 20 and not from booster-fuel supply 30 during stage 2. Bulk-supply 20 is fluidly disconnected from accumulator 100 by inactivating compressor 70 when accumulator pressure $P_A$ is greater than accumulator-upper-threshold pressure $P_{AUT}$. Stage 3 begins when bulk pressure $P_{BLK}$ reaches lower storage threshold pressure $P_{LST}$ such that bulk-fuel supply 20 can be considered effectively empty. In exemplary embodiments, compressor 70 includes a single compression stage whereby compressor 70 cannot increase gaseous fuel pressure from pressures below lower storage threshold pressure $P_{LST}$ to accumulator-lower-threshold pressure $P_{ALT}$ in a single compression stage. In this circumstance, gaseous fuel is supplied from booster-fuel supply 30 through regulator 122. Accordingly, during stage 3 bulk-shutoff valve 40 is closed, booster-shutoff valve 50 is open, three-way valve 92 fluidly connects conduit 58 to regulator 122, and three-way valve 82 is closed or fluidly connects conduit 57 to compressor 70. At the beginning of stage 3, booster pressure $P_{BSTR}$ is greater than accumulator-lower-threshold pressure $P_{ALT}$ whereby compressor 70 is not required and is in an off state. Stage 4 begins when booster pressure $P_{BSTR}$ drops below accumulator-lower-threshold pressure $P_{ALT}$. In this circumstance, gaseous fuel from booster-fuel supply 30 needs to be pressurized. Accordingly, during stage 4 bulk-shutoff valve 40 is closed, booster-shutoff valve 50 is open, three-way valve 82 is closed or fluidly connects conduit 57 to regulator 122, three-way valve 92 fluidly connects conduit 58 to compressor 70, and compressor 70 is on. During stage 4, since gaseous fuel can only be supplied from booster-fuel supply 30, there are periods during stage 4 when the engine demand is greater than the compressor flow for extended periods of time such that accumulator pressure $P_A$ drops below accumulator-lower-threshold pressure $P_{ALT}$. In this circumstance, in the illustrated embodiment there are no further gaseous fuel storage vessels containing high pressure gas that can be drawn upon to increase accumulator pressure $P_A$, and accordingly engine 140 can be power derated by controller 150 such that engine demand is limited to a level where accumulator pressure $P_A$ can be maintained at or above accumulator-lower-threshold pressure $P_{ALT}$. Whenever engine 140 is started, controller 150 can measure bulk pressure $P_{BLK}$ and booster pressure $P_{BSTR}$ and based on these pressures determine which one of stages 1, 2, 3, and 4 to begin operating engine 140 according to Table 1 below. Gaseous-fuel system 13 is in stage 1 when bulk pressure $P_{BLK}$ is greater than or equal to accumulator-lower-threshold pressure $P_{ALT}$; in stage 2 when lower storage threshold pressure $P_{LST}$ is less than or equal to bulk pressure $P_{BLK}$ and accumulator-lower-threshold pressure $P_{ALT}$ is greater than bulk pressure $P_{BLK}$; in stage 3 when bulk pressure $P_{BLK}$ is less than lower storage threshold pressure $P_{LST}$ and booster pressure $P_{BSTR}$ is greater than or equal to accumulator-lower-threshold pressure $P_{ALT}$; and in stage 4 when booster pressure $P_{BSTR}$ is less than accumulator-lower-threshold pressure $P_{ALT}$. In stage 2, booster pressure $P_{BSTR}$ is typically greater than accumulator-upper-threshold pressure $P_{AUT}$ throughout stage 2; however, gaseous-fuel system 13 can operate in stage 2 even when booster pressure $P_{BSTR}$ is greater than accumulator-lower-threshold pressure $P_{ALT}$ as shown in Table 1.

TABLE 1

|  | Bulk pressure $P_{BLK}$ | Booster pressure $P_{BSTR}$ |
| --- | --- | --- |
| Stage 1 | $P_{BLK} >= P_{ALT}$ | |
| Stage 2 | $P_{LST} <= P_{BLK} < P_{ALT}$ | $P_{BSTR} > P_{ALT}$ |
| Stage 3 | $P_{BLK} < P_{LST}$ | $P_{BSTR} >= P_{ALT}$ |
| Stage 4 | | $P_{BSTR} < P_{ALT}$ |

Figure 12:
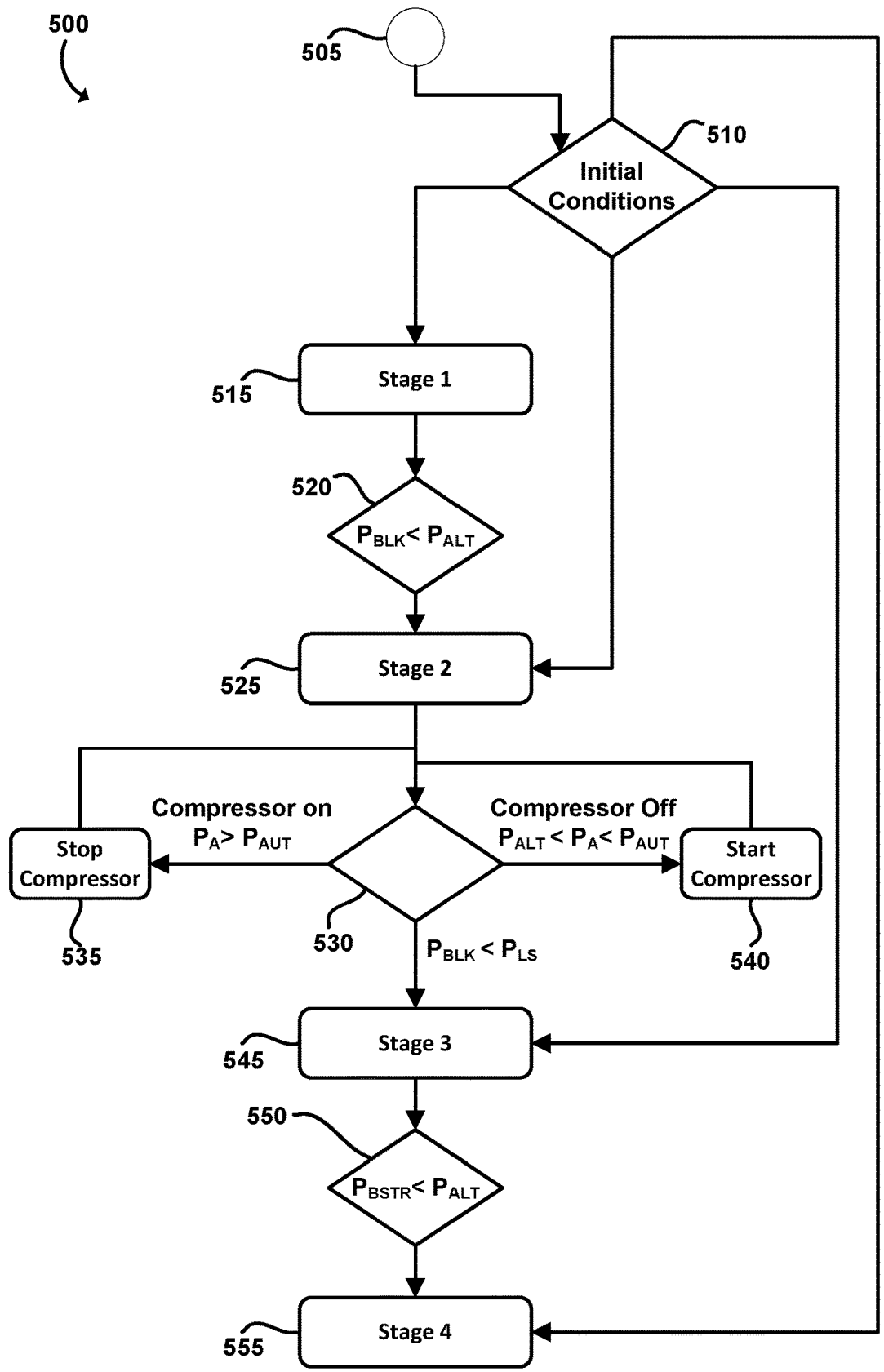
FIG. 12 is a flow chart view of a technique of operating the gaseous-fuel system of FIG. 10 according to an embodiment.

Referring now to FIG. 12 there is shown algorithm 500 that can be programmed in controller 150 and is a technique of supplying and pressurizing the gaseous fuel for internal combustion engine 140 according to the four stages described with reference to FIG. 11. In step 505 engine 140 is started, and after the engine starts an evaluation is made of the initial conditions of bulk-fuel supply 20 and booster-fuel supply 30 in step 510 to determine which of the stages illustrated in FIG. 11 using the rules in Table 1 to begin operation. In step 515 the conditions are met for stage 1 operation and the state of valves 40, 50, 82, and 92 and compressor 70 are set to stage 1 states according to Table 2 below and as previously discussed. In step 520, bulk pressure $P_{BLK}$ is monitored to determine when it is less than accumulator-lower-threshold pressure $P_{ALT}$, and when it is stage 2 is entered in step 525 where the state of valves 40, 50, 82, and 92 and compressor 70 are set to stage 2 states according to Table 2. Compressor 70 is turned on such that the gaseous fuel from bulk-fuel supply 20 is compressed into accumulator 100. Algorithm 500 proceeds to step 530 where accumulator pressure $P_A$ and bulk pressure $P_{BLK}$ are monitored. When compressor 70 is on and accumulator pressure $P_A$ rises above accumulator-upper-threshold pressure $P_{AUT}$ algorithm 500 proceeds to step 535 where controller 150 commands compressor 70 off to stop over pressurization of accumulator 100. Returning to step 530, when compressor 70 is off and accumulator pressure $P_A$ is less than accumulator-upper-threshold pressure $P_{AUT}$, algorithm 500 proceeds to step 540 where controller 150 commands compressor 70 on to pressurize gaseous fuel from bulk-fuel supply 20 into accumulator 100. To prevent compressor 70 from turning off and on repeatedly in a small time-interval (that is, compressor 70 is oscillating off and on), hysteresis can be employed before turning compressor 70 back on. For example, accumulator pressure $P_A$ can be allowed to deplete to any value between accumulator-upper-threshold pressure $P_{AUT}$ and accumulator-lower-threshold pressure $P_{ALT}$ before compressor 70 is turned back on by controller 150, and a desired amount of hysteresis can be a function of the engine demand. For example, when engine demand is large, the desired amount of hysteresis can be small, and when engine demand is low, the desired amount of hysteresis can be large. Returning to step 530, when bulk pressure $P_{BLK}$ is less than lower storage threshold pressure $P_{LST}$, algorithm 500 enters stage 3 and proceeds to step 545 where the state of valves 40, 50, 82, and 92 and compressor 70 are set to stage 3 states according to Table 2. Booster pressure $P_{BSTR}$ is monitored in step 550 to determine when it is less than accumulator-lower-threshold pressure $P_{ALT}$, and when it is algorithm 500 enters stage 4 and proceeds to step 550 where the state of valves 40, 50, 82, and 92 and compressor 70 are set to stage 4 states according to Table 2. Engine 140 continues to operate until booster pressure $P_{BSTR}$ drops below lower storage threshold pressure $P_{LST}$, at which point, gaseous-fuel system 13 cannot maintain rail pressure $P_R$ in fuel rail 130 at upper-desired-rail pressure $P_{UDR}$, at which point rail pressure $P_R$ can be decreased to lower-desired-rail pressure $P_{LDR}$ (where accumulator pressure $P_A$ is correspondingly decreased) where engine 140 operates in a derated manner, not capable of full power. Eventually gaseous-fuel system 13 cannot maintain accumulator pressure $P_A$ at a pressure threshold required by pressure regulator 120 to maintain rail pressure $P_R$ at lower-desired-rail pressure $P_{LDR}$, at which point engine 140 either stops or switches over to another ignition and combustion strategy that does not require the previously defined rail pressures $P_R$ to operate.

TABLE 2

| | Shut-off Valve 40 | Shut-off Valve 50 | Three-way valve 82 | Three-way valve 92 | Compressor 70 |
| --- | --- | --- | --- | --- | --- |
| Stage 1 | Open | Closed | Closed or Connects conduit 58 to compressor 70 | Connects conduit 57 to regulator 122 | Off |
| Stage 2 | Open | Open | Connects conduit 57 to compressor 70 | Connects conduit 58 to regulator 122 | On |
| Stage 3 | Closed | Open | Closed or Connects conduit 57 to compressor 70 | Connects conduit 58 to regulator 122 | Off |
| Stage 4 | Closed | Open | Connects conduit 58 to compressor 70 | Closed or Connects conduit 57 to regulator 122 | On |

Figure 13:
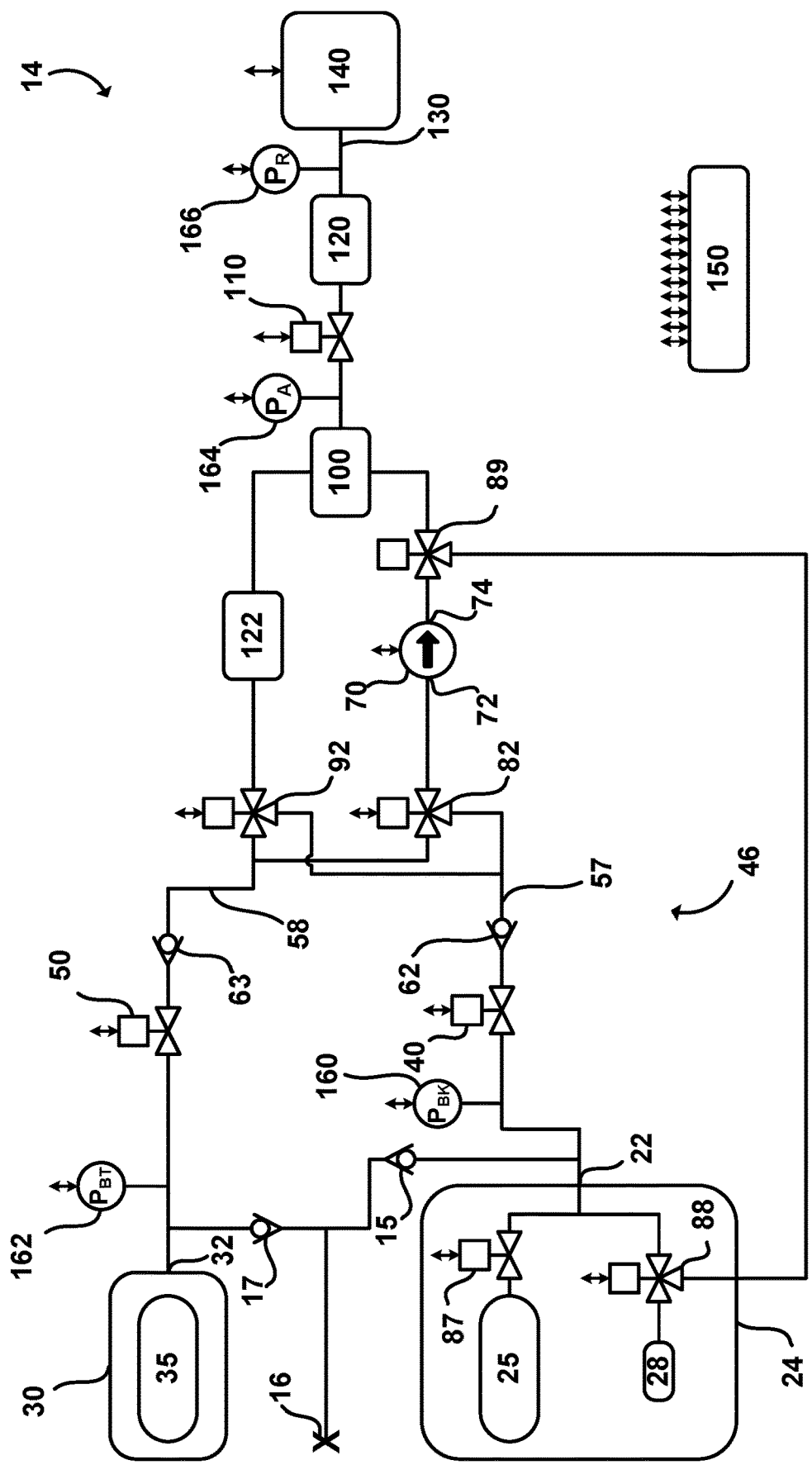
FIG. 13 is a schematic view of a gaseous-fuel system for pressurizing and supplying gaseous fuel to an internal combustion engine according to another embodiment.

Referring now to FIG. 13, there is shown gaseous-fuel system 14 that is like gaseous-fuel system 13 in FIG. 10 and only differences are discussed. Bulk-fuel supply 24 includes an additional vessel 28 that is smaller than vessel 25. Vessel 28 can be employed as an intermediate storage vessel in a multi-stage compression process, and in the illustrated embodiment vessel 28 is used in a two-stage compression process that pressurizes the gaseous fuel in vessel 25 when bulk pressure $P_{BLK}$ drops below lower storage threshold pressure $P_{LST}$. Vessel 25 is fluidly connected to inlet/outlet 22 through shut-off valve 87 and vessel 28 is fluidly connected to inlet/outlet 22 through three-way valve 88. Multi-stage compressor valve 89 fluidly connects compressor outlet 74 with either accumulator 100 or three-way valve 88. In operation, during stages 1 and 2 gaseous fuel is drawn from both vessels 25 and 28, and accordingly, shut-off valve 87 is open and three-way valve fluidly connects vessel 28 with inlet/outlet 22. Compressor 70 is employed during stage 2, but not stage 1, and accordingly three-way valve 89 fluidly connects compressor outlet 74 to accumulator 100 during at least stage 2. At the end of stage 2 when stage 3 is entered, both vessels 25 and 28 are at an equal pressure just below lower storage threshold pressure $P_{LST}$. While operating in stage 3, gaseous fuel from bulk-fuel supply 24 is not supplied to accumulator 100 and compressor 70 is not used. Accordingly, there is an opportunity during stage 3 to employ compressor 70 to pressurize the gaseous fuel in vessel 25 into vessel 28 in a first stage of compression, after which the gaseous-fuel pressure in vessel 28 will be within a pressure range above lower storage threshold pressure $P_{LST}$ and below accumulator-lower-threshold pressure $P_{ALT}$. Accordingly, shut-off valves 87 and 40 are open, three-way valve 82 connects conduit 57 to compressor 70, and three-way valves 89 and 88 connect compressor outlet 74 to vessel 28. Following the first stage of compression, gaseous-fuel system 14 can switch to a modified stage 2 operation mode where gaseous fuel from bulk-fuel supply 24 is supplied only by vessel 28. Accordingly, shut-off valve 87 is closed, three-way valve 88 fluidly connects vessel 28 with inlet/outlet 22 and three-way valve 89 fluidly connects compressor 70 with accumulator 100, and all other valves are set to their predetermined stage 2 settings as listed in Table 2. The modified stage 2 operation performs a second stage of compression where the gaseous fuel in vessel 28 that was previously pressurized by compressor 70 is pressurized again by compressor 70 to within a pressure range above accumulator-lower-threshold pressure $P_{ALT}$ and less than or equal to the upper storage threshold pressure $P_{UST}$. A volume of vessel 28 is selected such that a predetermined amount of fuel remains in vessel 28 after the modified stage 2 is completed. The modified stage 2 ends when gaseous-fuel pressure in vessel 28 drops below lower storage threshold pressure $P_{LST}$, which can be measured by bulk-fuel-supply pressure sensor 160. The smaller the volume of vessel 28, the smaller the amount of gaseous fuel remaining in vessel 28 after the modified stage 2 ends. One or more multi-stage cycles can be performed where for each multi-stage cycle the gaseous fuel from vessel 25 is first pressurized by compressor 70 into vessel 28, and then the gaseous fuel in vessel 28 is pressurized into accumulator 100. The final multi-stage cycle occurs when the pressure of gaseous fuel in vessel 25 is less than a second lower storage threshold pressure $P_{LST2}$. The second lower storage threshold pressure $P_{LST2}$ is that pressure below which the gaseous fuel cannot be pressurized in two stages by compressor 70 to the accumulator-lower-threshold pressure $P_{ALT}$. A volume ratio between a volume of vessel 25 over the volume of vessel 28 can be at least 1 (1:1), preferably the volume ratio is at least 10 (10:1), and more preferably the volume ratio is at least 20 (20:1). As would be understood by those familiar with the technology, there can be another vessel and associated three-way valve, like vessel 28 and three-way valve 88 that can be employed in a three-stage compression process, and in general there can be X vessels (including vessel 25) and X−1 three-way valves employed in an X-stage compression process where X is the number of stages.

Figure 14:
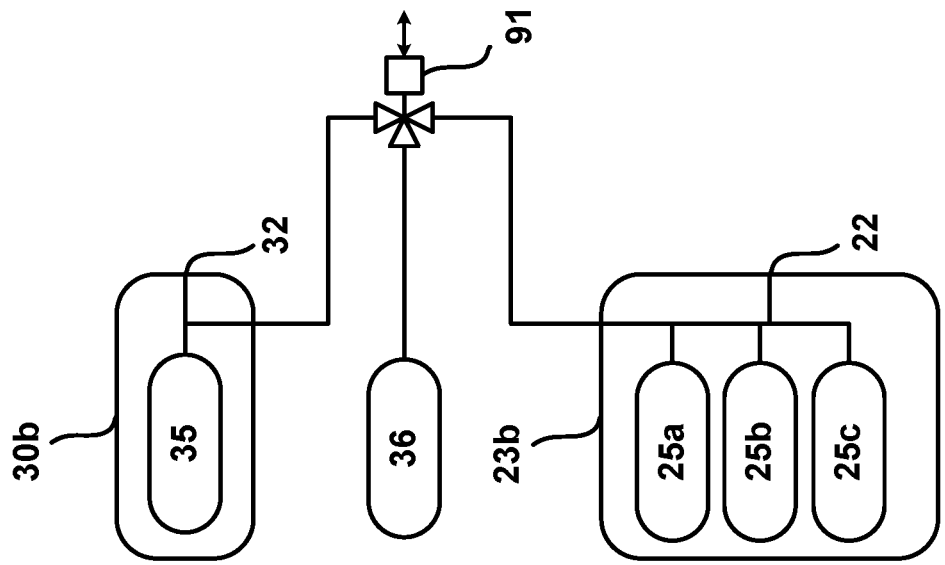
FIG. 14 is a schematic view of a bulk-fuel supply and a booster-fuel supply according to another embodiment.

Referring now to FIG. 14, bulk-fuel supply 23*b* and booster-fuel supply 30*b* can be used instead of bulk-fuel supply 20 and booster-fuel supply 30, respectively, for gaseous-fuel system 13 (seen in FIG. 10). Switchable vessel 36 can be selectively fluidly connected with either bulk-fuel supply 23*b* or booster-fuel supply 30*b*. Controller 150 (seen in FIG. 10) commands three-way valve 91 to fluidly connect switchable vessel 36 to bulk-fuel supply 23*b*, for example when a ratio of a volume of bulk-fuel supply 23*b* over a volume of booster-fuel supply 30*b* is desired to be larger, or to booster-fuel supply 30*b*, when the ratio is desired to be smaller. It may be desirable for the ratio of the volume of bulk-fuel supply 23*b* over the volume of booster-fuel supply 30*b* to be larger when upper storage threshold pressure $P_{UST}$ is increased. For example, it may be desired to fluidly connect switchable vessel 36 to bulk-fuel supply 23*b* when upper storage threshold pressure $P_{UST}$ is 700 bar, and, when upper storage threshold pressure $P_{UST}$ is 350 bar, it may be desired to fluidly connect switchable vessel 36 to booster-fuel supply 30*b*. It is application specific whether switchable vessel 36 is fluidly connected to bulk-fuel supply 23*b* or booster-fuel supply 30*b*. Other factors may influence which of fuel supplies 23*b* and 30*b* is augmented by switchable vessel 36, such as the capacity of compressor 70 and an operational pattern of engine 140 (and when engine 140 is used in a vehicle, the driving pattern of the vehicle). Switchable vessel 36 and three-way valve 91 can also be employed with gaseous-fuel system 14 seen in FIG. 13. In exemplary embodiments, a ratio of the volume of bulk-fuel supply 20, 23*b*, 24 over a volume of booster-fuel supply 30, 30*b*, 30, respectively, is between a range of 2.33 (7:3) to 4 (4:1) when the upper storage threshold pressure $P_{UST}$ is between a range of 100 bar and 400 bar, and particularly a value of 350 bar, and the ratio is between a range of 4 (4:1) to 9 (9:1) when the upper storage threshold pressure is between a range of 400 bar and 1000 bar, and particularly a value of 700 bar. An advantage of employing these ratios of the volumes between the bulk supply over the booster supply for the respective upper storage threshold pressure $P_{UST}$ ranges is that the system can increase the utilization of the fuel, particularly when an undersized compressor is employed, and this increased utilization of fuel can be achieved regardless of the fill pressure of the vessel since the volume ratio can be adjusted as required using switchable vessel 36.

By operating gaseous-fuel systems 10, 11, and 12 with either algorithm 200 and 201, and gaseous-fuel system 13 and 14 with algorithm 500 the size and cost of compressor 70 can be reduced compared to when there is only a single fuel vessel and algorithms 200 and 201 are not operated. A smaller compressor reduces parasitic energy losses resulting from operating the compressor thereby improving fuel economy of engine 140 and may increase cargo capacity of a vehicle. As in example, the compressor capacity can be reduced by up to two thirds compared to gaseous fuel systems that do not divide fuel storage into bulk storage and booster storage. Another advantage of gaseous-fuel systems 13 and 14 is that inlet 72 of compressor 70 will not be exposed to pressures higher than accumulator-lower-threshold pressure $P_{ALT}$, which in exemplary applications can be approximately one half the value of upper storage threshold pressure $P_{UST}$. This reduces the need for the compressor to be exposed to these high pressures, which can simplify the design requirements, reduce the cost, and increase the lifespan of the compressor.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus for pressurizing and supplying a gaseous fuel to an internal combustion engine comprising
   a first supply of the gaseous fuel;
   a second supply of the gaseous fuel;
   the gaseous fuel stored as a compressed gas in the first supply and the second supply;
   a pressure regulator that regulates a pressure of the gaseous fuel fluidly received from the first supply or the second supply;
   a compressor that pressurizes the gaseous fuel fluidly received from the first supply or the second supply;
   an accumulator configured to fluidly receive gaseous fuel flowing through the compressor and flowing through the pressure regulator; and
   a supply-select valve apparatus in fluid communication with the first supply and the second supply and actuatable to fluidly connect the first supply with the compressor or the pressure regulator, and to fluidly connect the second supply with the compressor or the pressure regulator;
   wherein the pressure regulator selectively fluidly receives the gaseous fuel from the first supply and the second supply such that the gaseous fuel selectively received by the pressure regulator bypasses the compressor, the compressor selectively fluidly receives the gaseous fuel from the first supply and the second supply such that the gaseous fuel selectively received by the compressor bypasses the pressure regulator, and the internal combustion engine fluidly receives gaseous fuel from the accumulator.

2. The apparatus as claimed in claim 1, further comprising a second pressure regulator receiving gaseous fuel from the accumulator; and
a fuel rail fluidly receiving gaseous fuel from the second pressure regulator, and supplying the gaseous fuel to the internal combustion engine;
wherein the pressure regulator regulates a pressure of the gaseous fuel in the accumulator to a threshold pressure and the second pressure regulator regulates a pressure of the gaseous fuel in the fuel rail to a desired rail pressure.

3. The apparatus as claimed in claim 1, further comprising a controller operatively connected with the supply-select valve apparatus and the compressor, and programmed to
in a first stage, when the pressure of the gaseous fuel in the first supply is greater than or equal to a threshold pressure of the gaseous fuel in the accumulator,
command the supply-select valve apparatus to supply the gaseous fuel from the first supply to the pressure regulator; and
command the compressor to an off state; and
in a second stage, when the pressure of the gaseous fuel in the first supply is less than the threshold pressure of the gaseous fuel in the accumulator and greater than or equal to a lower storage threshold pressure of the gaseous fuel in the first supply, and the pressure of the gaseous fuel in the second supply is greater than the threshold pressure of the gaseous fuel in the accumulator,
command the supply-select valve apparatus to supply the gaseous fuel from the first supply to the compressor and to supply the gaseous fuel from the second supply to the pressure regulator; and
command the compressor to pressurize the gaseous fuel fluidly received from the first supply into the accumulator.

4. The apparatus as claimed in claim 3, wherein
in the second stage the pressure regulator supplies gaseous fuel from the second supply to the accumulator when the pressure of the gaseous fuel in the accumulator is less than the threshold pressure of the gaseous fuel in the accumulator, or
the threshold pressure is a lower-threshold pressure of the gaseous fuel in the accumulator, and the controller is further programmed to in the second stage, when the pressure of the gaseous fuel in the accumulator is greater than an upper-threshold pressure of the gaseous fuel in the accumulator, command the compressor to an off state; or
the controller is further programmed to, in the second stage, when the compressor is an off state and when the pressure of the gaseous fuel in the accumulator is between the lower-threshold pressure and the upper-threshold pressure of the gaseous fuel in the accumulator, command the compressor to pressurize the gaseous fuel fluidly received from the first supply of the gaseous fuel.

5. The apparatus as claimed in claim 3, wherein the controller is further programmed to, in a third stage, when the pressure of the gaseous fuel in the first supply is less than the lower storage threshold pressure and the pressure of the gaseous fuel in the second supply is greater than or equal to the threshold pressure of the gaseous fuel in the accumulator,
command the supply-select valve apparatus to supply the gaseous fuel from the second supply to the pressure regulator; and
command the compressor to an off state.

6. The apparatus as claimed in claim 5, wherein the controller is further programmed to,
in a fourth stage, when the pressure of the gaseous fuel in the second supply is less than the threshold pressure of the gaseous fuel in the accumulator,
command the supply-select valve apparatus to supply the gaseous fuel from the second supply to the compressor; and
command the compressor to pressurize the gaseous fuel fluidly received from the second supply into the accumulator.

7. The apparatus as claimed in claim 6, wherein the controller is further programmed to,
when the internal combustion engine is started, compare the pressure of the gaseous fuel in the first supply and the pressure of the gaseous fuel in the second supply to the lower storage threshold pressure and the threshold pressure of the gaseous fuel in the accumulator; and
command the first stage, the second stage, the third stage, or the fourth stage according to the comparison.

8. The apparatus as claimed in claim 6, further comprising a second pressure regulator receiving gaseous fuel from the accumulator; and
a fuel rail fluidly receiving gaseous fuel from the second pressure regulator;
wherein the pressure regulator regulates a pressure of the gaseous fuel in the accumulator to a threshold pressure and the second pressure regulator regulates a pressure of the gaseous fuel in the fuel rail to a desired rail pressure.

9. The apparatus as claimed in claim 1, wherein a ratio between a volume of the first supply over a volume of the second supply is a function of an upper storage threshold pressure, whereby the ratio is directly correlated to the upper storage threshold pressure.

10. The apparatus as claimed in claim 1, wherein a ratio between a volume of the first supply over a volume of the second supply is between a range of 2.33 (7:3) to 4 (4:1) when an upper storage threshold pressure is between a range of 100 bar and 400 bar, and the ratio is between a range of 4 (4:1) to 9 (9:1) when the upper storage threshold pressure is between a range of 400 bar and 1000 bar.

11. The apparatus as claimed in claim 1, wherein the gaseous fuel is selected from the list containing ammonia, hydrogen, methane, propane, natural gas, and mixtures of these fuels.

12. The apparatus as claimed in claim 1, further comprising a supply-select valve apparatus in fluid communication with the first supply and the second supply and actuatable to fluidly connect the first supply with the compressor or the pressure regulator, and to fluidly connect the second supply with the compressor or the pressure regulator.

13. A method for pressurizing and supplying a gaseous fuel to an internal combustion engine comprising:
storing the gaseous fuel as a compressed gas in a first supply and a second supply;

selectively regulating a pressure of the gaseous fuel from the first supply and a pressure of the gaseous fuel from the second supply to a threshold pressure in an accumulator;

selectively compressing the gaseous fuel from the first supply and the gaseous fuel from the second supply into the accumulator, wherein the gaseous fuel that is selectively compressed bypasses the step of selectively regulating the pressure of the gaseous fuel; and supplying the internal combustion engine with the gaseous fuel from the accumulator, wherein the gaseous fuel having the pressure that is selectively regulated bypasses the step of selectively compressing the gaseous fuel.

14. The method as claimed in claim 13, further comprising regulating a pressure of the gaseous fuel from the accumulator to a desired rail pressure; and supplying the gaseous fuel at the desired rail pressure to the internal combustion engine.

15. The method as claimed in claim 13, further comprising in a first stage, when the pressure of the gaseous fuel in the first supply is greater than or equal to the threshold pressure of the gaseous fuel in the accumulator, regulating the pressure of the gaseous fuel from the first supply to the threshold pressure in the accumulator; and fluidly disconnecting the second supply from the accumulator.

16. The method as claimed in claim 15, further comprising:

in a second stage, when the pressure of the gaseous fuel in the first supply is less than the threshold pressure of the gaseous fuel in the accumulator and greater than or equal to a lower storage threshold pressure of the gaseous fuel in the first supply, and the pressure of the gaseous fuel in the second supply is greater than the threshold pressure of the gaseous fuel in the accumulator, compressing the gaseous fuel from the first supply into the accumulator; and regulating the pressure of the gaseous fuel from the second supply to the threshold pressure in the accumulator;

wherein the pressure of the gaseous fuel in the accumulator is between the threshold pressure and an upper threshold pressure.

17. The method as claimed in claim 16, wherein in the second stage, when the internal combustion engine consumes more fuel than can be supplied by compressing the gaseous fuel from the first supply and the pressure of the gaseous fuel in the accumulator drops below the threshold pressure, further comprising regulating the pressure of the gaseous fuel from the second supply is regulated to the threshold pressure in the accumulator; or in the second stage, when the pressure of the gaseous fuel in the accumulator is greater than the upper threshold pressure of the gaseous fuel in the accumulator, further comprising disconnecting the gaseous fuel from the first supply is fluidly disconnected from the accumulator; or in the second stage, when the first supply is fluidly disconnected from the accumulator and the pressure of the gaseous fuel in the accumulator is between the threshold pressure and the upper threshold pressure of the gaseous fuel in the accumulator, further comprising compressing the gaseous fuel from the first supply into the accumulator.

18. The method as claimed in claim 17, further comprising in a third stage, when the pressure of the gaseous fuel in the first supply is less than the lower storage threshold pressure and the pressure of the gaseous fuel in the second supply is greater than or equal to the threshold pressure of the gaseous fuel in the accumulator, regulating the pressure of the gaseous fuel from the second supply to the threshold pressure in the accumulator; and fluidly disconnecting the first supply from the accumulator.

19. The method as claimed in claim 18, further comprising in a fourth stage, when the pressure of the gaseous fuel in the second supply is less than the threshold pressure of the gaseous fuel in the accumulator, compressing the gaseous fuel from the second supply into the accumulator.

20. An apparatus for pressurizing and supplying a gaseous fuel to an internal combustion engine comprising a first supply of the gaseous fuel;

a second supply of the gaseous fuel;

the gaseous fuel stored as a compressed gas in the first supply and the second supply;

a pressure regulator that regulates a pressure of the gaseous fuel fluidly received from the first supply or the second supply;

a compressor that pressurizes the gaseous fuel fluidly received from the first supply or the second supply;

an accumulator configured to fluidly receive gaseous fuel from the compressor and the pressure regulator; and a supply-select valve apparatus in fluid communication with the first supply and the second supply and actuatable to fluidly connect the first supply with the compressor or the pressure regulator, and to fluidly connect the second supply with the compressor or the pressure regulator; and a controller operatively connected with the supply-select valve apparatus and the compressor, and programmed to in a first stage, when the pressure of the gaseous fuel in the first supply is greater than or equal to a threshold pressure of the gaseous fuel in the accumulator, command the supply-select valve apparatus to supply the gaseous fuel from the first supply to the pressure regulator; and command the compressor to an off state;

wherein the pressure regulator selectively fluidly receives the gaseous fuel from the first supply or the second supply, the compressor selectively fluidly receives the gaseous fuel from the first supply or the second supply, and the internal combustion engine fluidly receives gaseous fuel from the accumulator.

* * * * *